United States Patent
Gooneratne et al.

(10) Patent No.: US 11,280,177 B2
(45) Date of Patent: Mar. 22, 2022

(54) MONITORING RIG ACTIVITIES

(71) Applicant: Saudi Arabian Oil Company, Dhahran (SA)

(72) Inventors: Chinthaka Pasan Gooneratne, Dhahran (SA); Michael Affleck, Aberdeen (GB); Timothy E. Moellendick, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/715,820

(22) Filed: Dec. 16, 2019

(65) Prior Publication Data
US 2020/0190959 A1 Jun. 18, 2020

Related U.S. Application Data

(60) Provisional application No. 62/780,833, filed on Dec. 17, 2018, provisional application No. 62/780,856, (Continued)

(51) Int. Cl.
*G01N 21/88* (2006.01)
*H04N 5/225* (2006.01)
(Continued)

(52) U.S. Cl.
CPC .......... *E21B 47/04* (2013.01); *E21B 17/02* (2013.01); *E21B 21/08* (2013.01); (Continued)

(58) Field of Classification Search
CPC ..... E21B 47/11; E21B 21/08; G05B 19/4155; H04N 2005/2255; H04N 5/225; G01N 21/8851
See application file for complete search history.

(56) References Cited

U.S. PATENT DOCUMENTS 5,107,705 A 4/1992 Wraight et al.
7,395,878 B2 * 7/2008 Reitsma ............... E21B 21/08
175/38
(Continued)

FOREIGN PATENT DOCUMENTS

GB 2532967 6/2016
NO 343139 11/2018
(Continued)

OTHER PUBLICATIONS

Akersolutions, Aker MH CCTC Improving Safety, Jan. 2008.
(Continued)

*Primary Examiner* — Rowina J Cattungal
(74) *Attorney, Agent, or Firm* — Fish & Richardson P.C.

(57) ABSTRACT

Image sensors are positioned around a rig floor. An on-site edge or fog computing gateway is communicably coupled to the image sensors. The on-site edge or fog computing gateway includes one or more processors and a non-transitory computer-readable storage medium coupled to the one or more processors and storing programming instructions for execution by the one or more processors. The programming instructions instruct the one or more processors to do the following: receive an image stream form at least one of the plurality of image sensors; generate, from the image stream, an operating condition; determine that an automation rule includes the operating condition generated from the image stream; in response to determining that an automation rule includes the operating condition, send an instruction to drive a controllable device; and, in response to sending an instruction to drive the controllable device, drive the controllable device.

34 Claims, 14 Drawing Sheets

Related U.S. Application Data filed on Dec. 17, 2018, provisional application No. 62/780,843, filed on Dec. 17, 2018.

(51) Int. Cl.

| | | |
|---|---|---|
| *E21B 47/04* | (2012.01) | |
| *E21B 17/02* | (2006.01) | |
| *E21B 41/00* | (2006.01) | |
| *E21B 47/00* | (2012.01) | |
| *G06Q 30/06* | (2012.01) | |
| *G06Q 50/02* | (2012.01) | |
| *E21B 47/11* | (2012.01) | |
| *E21B 21/08* | (2006.01) | |
| *E21B 44/02* | (2006.01) | |
| *G01F 1/704* | (2006.01) | |
| *G05B 19/4155* | (2006.01) | |
| *G08B 21/18* | (2006.01) | |
| *E21B 3/04* | (2006.01) | |
| *E21B 19/00* | (2006.01) | |
| *E21B 21/06* | (2006.01) | |
| *E21B 21/10* | (2006.01) | |
| *E21B 33/06* | (2006.01) | |

(52) U.S. Cl.
CPC .......... *E21B 41/0092* (2013.01); *E21B 44/02* (2013.01); *E21B 47/00* (2013.01); *E21B 47/11* (2020.05); *G01F 1/704* (2013.01); *G01N 21/8851* (2013.01); *G05B 19/4155* (2013.01); *G06Q 30/0633* (2013.01); *G06Q 50/02* (2013.01); *G08B 21/187* (2013.01); *H04N 5/225* (2013.01); *E21B 3/04* (2013.01); *E21B 19/008* (2013.01); *E21B 21/062* (2013.01); *E21B 21/106* (2013.01); *E21B 33/061* (2013.01); *G05B 2219/31229* (2013.01); *H04N 2005/2255* (2013.01)

(56) References Cited

U.S. PATENT DOCUMENTS

| | | | | |
|---|---|---|---|---|
| 8,550,174 B1* | 10/2013 | Orgeron | ................... | E21B 19/24 |
| | | | | 166/380 |
| 9,328,574 B2* | 5/2016 | Sehsah | ..................... | E21B 21/08 |
| 9,355,440 B1 | 5/2016 | Chen et al. | | |
| 2004/0182574 A1 | 9/2004 | Sarmad et al. | | |
| 2008/0173480 A1 | 7/2008 | Annaiyappa et al. | | |
| 2009/0164125 A1 | 6/2009 | Bordakov et al. | | |
| 2014/0270793 A1* | 9/2014 | Bradford | .............. | H04B 10/116 |
| | | | | 398/118 |
| 2015/0091737 A1 | 4/2015 | Richardson et al. | | |
| 2015/0345261 A1* | 12/2015 | Kruspe | .................. | H04N 7/183 |
| | | | | 175/40 |
| 2016/0194157 A1 | 7/2016 | Senn et al. | | |
| 2017/0314369 A1 | 11/2017 | Rosano et al. | | |
| 2018/0240322 A1 | 8/2018 | Potucek et al. | | |
| 2018/0315111 A1 | 11/2018 | Alvo et al. | | |
| 2019/0078426 A1* | 3/2019 | Zheng | ..................... | E21B 44/00 |
| 2019/0090056 A1 | 3/2019 | Rexach et al. | | |
| 2019/0090330 A1* | 3/2019 | Aykroyd | .............. | H01R 25/147 |
| 2019/0100988 A1* | 4/2019 | Ellis | ......................... | E21B 47/00 |
| 2019/0145183 A1* | 5/2019 | Potash | .................... | E21B 12/02 |
| | | | | 700/175 |
| 2019/0282089 A1* | 9/2019 | Wang | ................... | A61B 3/0025 |
| 2020/0081439 A1 | 3/2020 | Mukherjee et al. | | |

FOREIGN PATENT DOCUMENTS

| | | |
|---|---|---|
| NO | 20161842 | 5/2019 |
| WO | 2017132297 | 8/2017 |
| WO | 2019055240 | 3/2019 |
| WO | 2019169067 | 9/2019 |
| WO | 2019236288 | 12/2019 |

OTHER PUBLICATIONS

Artymiuk et al., "The new drilling control and monitoring system," Acta Montanistica Slovaca, Sep. 2004, 9(3): 145-151.

PCT International Search Report and Written Opinion in International Appln. No. PCT/US2019/066549, dated Apr. 1, 2020, 19 pages.

Anwar et al.,"Fog computing: an overview of big IoT data analytics," Wireless communications and mobile computing, May 2018, 2018: 1-22.

Bilal et al., "Potentials, trends, and prospects in edge technologies: Fog, cloudlet, mobile edge, and micro data centers," Computer Networks, Elsevier, Oct. 2017, 130: 94-120.

Dickens et al., "An LED array-based light induced fluorescence sensor for real-time process and field monitoring," Sensors and Actuators B: Chemical, Elsevier, Apr. 2011, 158(1): 35-42.

Liu et al., "Flow visualization and measurement in flow field of a torque converter," Mechanic automation and control Engineering, Second International Conference on IEEE, Jul. 15, 2011, 1329-1331.

Nuth, "Smart oil field distributed computing," The Industrial Ethernet Book, Nov. 2014, 85(14): 1-3.

PCT International Search Report and Written Opinion in International Appln. No. PCT/US2019/066577, dated Apr. 2, 2020, 18 pages.

PCT International Search Report and Written Opinion in International Appln. No. PCT/US2019/066602, dated Apr. 3, 2020, 15 pages.

GCC Examination Report in GCC Appln. No. GC 2019-38842, dated Nov. 8, 2020, 5 pages.

GCC Examination Report in GCC Appln. No. GC 2019-38843, dated Nov. 8, 2020, 6 pages.

GCC Examination Report in GCC Appln. No. GC 2019-38844, dated Nov. 5, 2020, 6 pages.

GCC Examination Report in GCC Appln. No. GC 2019-38844, dated May 20, 2021, 4 pages.

GCC Examination Report in GCC Appln. No. GC 2019-38842, dated May 19, 2021, 4 pages.

GCC Examination Report in GCC Appln. No. GC 2019-38843, dated May 18, 2021, 5 pages.

\* cited by examiner

MONITORING RIG ACTIVITIES

CROSS-REFERENCE TO RELATED APPLICATIONS

This application claims priority to U.S. Provisional Patent Application No. 62/780,833, filed Dec. 17, 2018, U.S. Provisional Patent Application No. 62/780,843, filed Dec. 17, 2018, and U.S. Provisional Patent Application No. 62/780,856, filed Dec. 17, 2018, the contents of while are hereby incorporated by reference.

TECHNICAL FIELD

The present disclosure applies to monitoring activities on a rig floor.

BACKGROUND

Drilling rigs are used for drilling and producing hydrocarbons from a well, and include a large number of components and tools that perform complex and often time-consuming operations. Drilling a well is a challenging procedure due to the inability to see the trajectory of the well, rock formations, and the harsh environment downhole. These factors and the many uncertainties and variables during a drilling operation on a rig creates a dynamic drilling process. Monitoring the processes involved in drilling and other operations on a rig can be difficult and ineffective, and delays or breakdowns in machinery and components can have a significant impact on time and cost during a drilling operation.

Drill rigs are often set-up quickly at remote sites. To facilitate the rapid assembly and disassembly, the use of wireless (typically radio-frequency) communication between components is common as it reduces the number of wired connections needing to be manipulated during set-up and teardown.

SUMMARY

The present disclosure describes techniques that can be used for monitoring rig activities.

An example implementation of the subject matter described within this disclosure is a system with the following features. Image sensors are positioned around a rig, such as on a rig floor or elsewhere on a drilling rig. An on-site edge or fog computing gateway is communicably coupled wired or wirelessly to the image sensors. The on-site edge or fog computing gateway includes one or more processors and a non-transitory computer-readable storage medium coupled to the one or more processors and storing programming instructions for execution by the one or more processors. The programming instructions instruct the one or more processors to receive an image stream form at least one of the plurality of image sensors. The programming instructions instruct the one or more processors to generate, from the image stream, an operating condition. The programming instructions instruct the one or more processors to determine that an automation rule includes the operating condition generated from the image stream. The programming instructions instruct the one or more processors to, in response to determining that an automation rule includes the operating condition, send an instruction wired or wirelessly to drive a controllable device. The programming instructions instruct the one or more processors to, in response to sending an instruction to drive the controllable device, drive the controllable device.

Aspects of the example implementation, which can be combined with the example implementation alone or in part, include the following. The programming instructions can include determining a priority, or urgency, of the generated operating condition (such as a risk of a stuck pipe) and communicate the detected operating condition to an automation system configured to proactively prevent or recover the operating condition to normalized operations, and apply a ranking criteria to the operating condition based on a severity and probability of occurrence of the operating condition (such as stuck pipe, lost circulation, or well influx), the ranking criteria configured to determine an order of operations for prioritizing a next recommended task. The programming instructions can also include executing an action automatically to address (or solve) the operating condition or provide guidance to manually intervene to address the operating condition.

Aspects of the example implementation, which can be combined with the example implementation alone or in part, include the following. The system can include a first wired or wireless communicable coupling between the plurality of image sensors and the on-site edge or fog computing gateway, and a second wired or wireless communicable coupling between the on-site edge or fog computing gateway and the controllable device.

Aspects of the example implementation, which can be combined with the example implementation alone or in part, include the following. LED arrays are in view of at least one of the image sensors. LED drivers are electronically coupled to each one of the LED arrays. Each LED driver is configured to modulate the LED array to transfer data.

Aspects of the example implementation, which can be combined with the example implementation alone or in part, include the following. The LED arrays includes monochrome LEDs.

Aspects of the example implementation, which can be combined with the example implementation alone or in part, include the following. The system can include a plurality of particles including tracer particles with optical properties added to a mud system configured for detection by the plurality of image sensors, where an image sensor of the plurality of image sensors includes a particle image velocimetry (PIV) configured to visualize the particles and at least one of determine a flow speed of the particles or determine the pH of the particles, a wheel with reflectors proximate to a flow in line and a flow out line of the mud system, the plurality of image sensors configured to monitor a velocity of the wheel turning in response to the flow of the mud, an automated fluid management system including tanks with level indicators configured for detection by the plurality of image sensors, and a target attached to a kelly saver sub on the rig, the target including an identifier including at least one of a reflector or an LED, the identifier configured to be detected by the image sensor.

Aspects of the example implementation, which can be combined with the example implementation alone or in part, include the following. The image sensors are configured to receive the data from the LED array and convert the instructions to be included into the image stream.

Aspects of the example implementation, which can be combined with the example implementation alone or in part, include the following. The generated operating condition includes the instructions.

Aspects of the example implementation, which can be combined with the example implementation alone or in part, include the following. The controllable device includes a valve.

Aspects of the example implementation, which can be combined with the example implementation alone or in part, include the following. The controllable device includes a drawworks, kelly, swivel, rotary table, topdrive, or blowout preventer valves.

Aspects of the example implementation, which can be combined with the example implementation alone or in part, include the following. The controllable device includes a pump, motor, mixer, or circulating system.

Aspects of the example implementation, which can be combined with the example implementation alone or in part, include the following. The controllable device includes well shutdown system.

An example implementation of the subject matter described within this disclosure is a method with the following features. An image stream is received form at least one of several image sensors. An operating condition is generated from the image stream. An automation rule is determined to include the operating condition generated from the image stream. In response to determining that an automation rule includes the operating condition, an instruction to drive a controllable device is sent. In response to sending an instruction to drive the controllable device, the controllable device is driven.

Aspects of the example implementation, which can be combined with the example implementation alone or in part, include the following. A set of instructions is encoded by an LED driver. An LED array is modulated by the LED driver to emit the set of instructions. The set of instructions is received by at least one of the image sensors. The set of instructions is converted into the image stream by at least one of the plurality of image sensors.

Aspects of the example implementation, which can be combined with the example implementation alone or in part, include the following. Encoding the instructions includes on-off-key modulation.

Aspects of the example implementation, which can be combined with the example implementation alone or in part, include the following. The on-off-key modulation includes under sampled frequency shift on-off-keying.

Aspects of the example implementation, which can be combined with the example implementation alone or in part, include the following. Receiving the instruction includes using under sampled frequency shift on-off-keying.

Aspects of the example implementation, which can be combined with the example implementation alone or in part, include the following. The LED array is a first LED array, and the set of instructions is a first set of instructions. A second set of instructions is received from a second LED array by the image sensor while simultaneously receiving instructions from the first LED array.

Aspects of the example implementation, which can be combined with the example implementation alone or in part, include the following. The controllable device is driven responsive to the sent instruction.

Aspects of the example implementation, which can be combined with the example implementation alone or in part, include the following. The controllable device includes a valve. Driving the controllable device includes changing a position of the valve.

Aspects of the example implementation, which can be combined with the example implementation alone or in part, include the following. The controllable device includes a rotary table. Driving the controllable device includes changing a tension on a drawworks, Kelly, swivel, rotary table, topdrive, or blowout preventer rams.

Aspects of the example implementation, which can be combined with the example implementation alone or in part, can include one or more of the following. The controllable device can include a rotary table, and driving the controllable device can include changing the speed of the rotary table. The controllable device can include a top drive, and driving the controllable device can include changing weight on the drill bit. The controllable device can include a top drive, and driving the controllable device can include changing rotational speed of the top drive. The controllable device can include a motor, and driving the controllable device can include changing torque applied by the motor. The controllable device can include a blow out preventer, and driving the controllable device can include closing the rams of the blowout preventer. The controllable device can include a mud motor, and driving the controllable device can include changing rotational speed of the mud motor. The controllable device can include a mud mixer, and driving the controllable device can include changing mixing speed and frequency of the mud mixer. The controllable device can include a mud circulating system, and driving the controllable device can include changing circulating speed and frequency of the system.

Aspects of the example implementation, which can be combined with the example implementation alone or in part, include the following. The controllable device comprises a pump. Driving the controllable device includes changing a rotational speed of the pump, motor, mixer or circulating system.

Aspects of the example implementation, which can be combined with the example implementation alone or in part, include the following. The controllable device comprises a pump. Driving the controllable device includes changing a rotational speed of the pump, motor, mixer or circulating system.

An example implementation of the subject matter described within this disclosure is a system with the following features. Image sensors are positioned around a rig, such as a rig floor or anywhere else on a rig. LED arrays are in view of at least one of the image sensors. LED drivers are electronically coupled to the LED arrays. Each LED driver is configured to modulate the LED array to transfer data. An on-site edge or fog computing gateway is communicably coupled to the image sensors and includes one or more processors, and a non-transitory computer-readable storage medium coupled to the one or more processors and storing programming instructions for execution by the one or more processors. The programming instructions instruct the one or more processors to receive an image stream form at least one of the image sensors. The image stream includes data from at least one of the LED arrays. The programming instructions instruct the one or more processors to generate, from the image stream, an operating condition. The programming instructions instruct the one or more processors to determine that an automation rule includes the operating condition generated from the image stream. The programming instructions instruct the one or more processors to responsive to determining that an automation rule includes the operating condition, send an instruction to drive a controllable device.

Aspects of the example implementation, which can be combined with the example implementation alone or in part, include the following. The programming instructions can include determining a priority, or urgency, of the generated operating condition (such as a risk of a stuck pipe) and communicate the detected operating condition to an automation system configured to proactively prevent or recover the operating condition to normalized operations, and apply a ranking criteria to the operating condition based on a severity and probability of occurrence of the operating condition (such as stuck pipe, lost circulation, or well influx), the ranking criteria configured to determine an order of operations for prioritizing a next recommended task. The programming instructions can also include executing an action automatically to address (or solve) the operating condition or provide guidance to manually intervene to address the operating condition.

The previously described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/the instructions stored on the non-transitory, computer-readable medium.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

Figure 1:
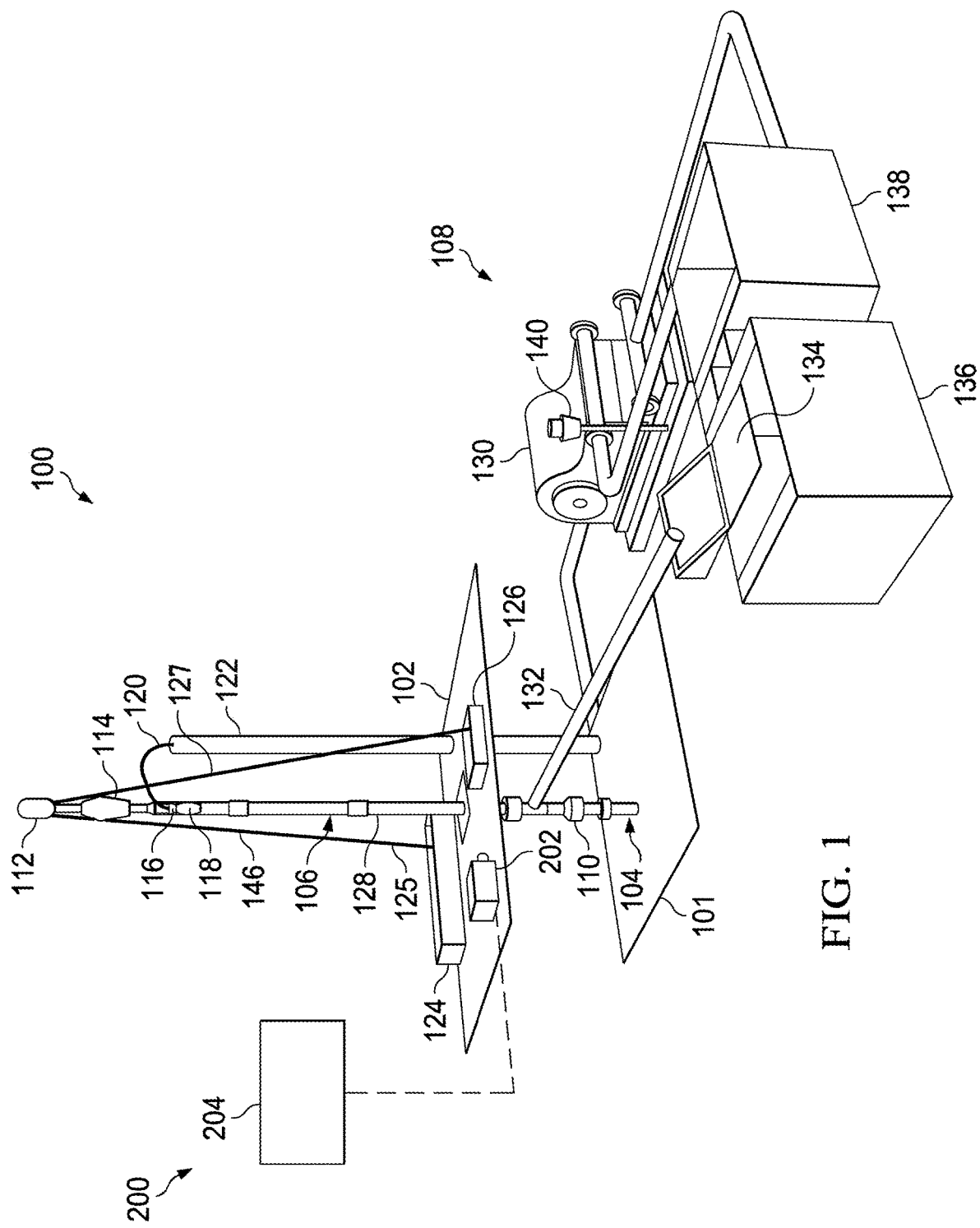
FIG. 1. is a perspective schematic diagram of an example rig system used for drilling operations.

The following detailed description describes techniques for monitoring activities on a rig floor. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Most of the work done on automation and digitalization of drilling has focused on integrating sensors, instrumentation, and algorithms to improve the way raw data is extracted, analyzed and turned into useful information, which can then be used to optimize drilling operations. The objective in these works have been to leverage the knowledge and experience of drilling engineers with real-time data to create automation/digitalization platforms based on pre-drill simulation models, which provides guidance and allows/requires input from the drilling engineers to make critical decisions. Algorithms have been developed to improve drilling dynamics such as WOB, ROP, torque, vibration, drilling fluid hydraulics such as wellbore cleaning, stability and integrity and wellbore steering while drilling directional wells. The long term vision of incorporating these models into a real-time drilling system is to simulate a drilling engineer's response and automate the decision making process with minimal input from the drilling engineer, who is located off site and will only intervene when absolutely needed.

The work done so far focuses on sensors, instrumentation, and algorithms to increase the efficiency of drilling. The quality of the algorithms for automation/digitalization is only as good as the data utilized to construct them, and compared with other industries and applications, the advancements in sensors and instrumentation in drilling have been minimal, incremental, or none, in some areas of drilling. It is also hard to change the infrastructure of a drilling rig and the drilling culture, which is generally resistant to change because for decades operational decisions have been made based on the overall experience and knowledge of drilling personnel. This disclosure takes into account the current limitations/challenges of automation/digitalization in drilling and the 4IR, which promises to impact all disciplines, economies and industries. To adapt and keep up with the resulting shifts and disruptions, and fully reap benefits from the technologies, associated with 4IR, it is believed drilling will have to take a technology leap and not a technology step. This disclosure describes the layout of an internet of things (IoT) platform on drilling rigs to pave the way for drilling operations to take advantage of emerging technologies aligned with the fourth industrial revolution. 4IR technologies include smart sensors/devices, big data analytics, artificial intelligence, advanced materials and robotics and all these lay the platform for the main pillar of 4IR, IoT. An IoT system includes a network of dynamic interlinked components that utilizes smart sensors/devices to acquire data, actuators that respond to sensor information, communication to facilitate data transfer between devices and machine learning/artificial intelligence/big data analytics to process, enrich and present the data in a way to initiate action.

This disclosure describes an IoT platform to be used on a drilling rig, including smart, waterproof, high resolution, wireless cameras, or any other image or vision sensor, for image/video capture and edge/fog computing hardware and software for image/video processing and intelligent analytics. Cameras provide a non-invasive method of monitoring processes, and can function as artificial eyes observing a multitude of operations on a rig. Drilling rigs that utilize cameras today are limited to simple monitoring, and utilizing cameras purely for monitoring is not feasible economically and time-wise, since a large number of personnel will have to be involved to observe and analyze the videos/images acquired by the cameras. Cameras have made rapid progress towards being miniature and smart, where it is now common to have high resolution cameras in smartphones. These advancements have also made it an ideal sensing device for a drilling environment since it can be installed anywhere on a rig. While before the cameras were simply devices to acquire images/videos, fog/edge computing makes it possible for these cameras to be 'conscious' and 'intelligent' and play a critical role in automation/digitalization facilitating remote management of operations. Advantages of the IoT setup proposed in this disclosure is that it not only lays the infrastructure for automation and digitalization on a rig aligned with the 4IR, but it is also minimally invasive or non-invasive to current established drilling operations.

This disclosure describes intelligent monitoring and inspection of well processes on a rig, including an image-based inspection and analysis of rig processes and well components and equipment for failure modes. A monitoring system includes an image sensor and an on-site edge gateway positioned on a rig to monitor equipment and other well components that make up a rig process, identify present or potential failures in the integrity of the component(s) that can affect a rig process, and propose (and in some instances, act on) a fix for the identified failures or defect in the process, all in substantially real time. The processes that the monitoring system monitors can vary based on the target object of the image sensor, such as tools on a drillstring, casing components, other well tools, or other well components on a rig involved in a drilling process. The image sensor, such as one or more cameras, is positioned about a rig and directed at a target component or group of components, such as drilling components that make up certain drilling processes, and provides real-time image feed, such as images or video feed, to the gateway computing system located on-site at the rig. The gateway receives the image feed from the image sensor(s), and performs a processing and analysis of the image feed to identify an operating parameter of the targeted well equipment, determine an operating condition of the targeted well equipment based on the identified operating parameter, and propose, act on, or both propose and act on a fix based on the determined operating condition. The on-site edge gateway is an edge-fog gateway, in that the computing system components of the gateway that perform the analysis are located locally on the rig, for example, without having to transfer information and data or outsource analysis to a remote computing system in order to propose or act on a fix to a determined operating condition. This monitoring system is able to continuously monitor well components in real time, and thereby monitor drilling processes on the drill rig, and perform continuous image and signal processing to extract operating parameter information, identify operating conditions such as faults and anomalies in the well component, and propose a fix if the identified operating condition reaches a failure threshold of the well component.

In conventional drill rigs, inspection of drill string processes is either unmonitored or performed in-person by visual inspection and prone to inaccuracies and human error. Further, inspection of drill string components or other components is often performed by in-person visual inspection, or by non-destructive inspection, such as ultrasonic- or electromagnetic-based inspection, and ordering replacement components involves manual entry of part numbers and other information after in-person visual inspection identifies a fault. These inspections and orders can be time-consuming, ineffective, and prone to human error, which can lead to significant and unplanned lost time and drilling costs. The monitoring system of the present disclosure provides real-time monitoring of rig processes using image sensors and advanced processing techniques, and identifies failure modes of rig processes or well components from the image feed of the image sensors. Based on the identified failure mode(s), the monitoring system can propose action item options to a well operator or actively act on an action item, for example, that addresses the failure mode, such as ordering a replacement part from a manufacturer, requesting the shipment of a replacement part from a storage warehouse, or printing a replacement part on a printer (for example, 3D printer). The monitoring system provides for synchronization of drilling operations and material supply operations for seamless integration and predictive maintenance of well components on a rig. For example, the monitoring system monitors and inspects drill string and casing components, as well as the various instruments and equipment on a drilling rig, and utilizes edge-fog computing based smart analytics to streamline the relationship between rig processes and component maintenance, inventory, and supply chain management. The monitoring system provides a network of dynamic, interlinked components that utilize smart sensors and smart devices to acquire data, actuators that respond to sensor information, communication to facilitate data transfer between devices, and machine learning/artificial intelligence/big data analytics to process, enrich and present the data in a way to initiate automatic action or prompted action to an operator.

As drill rigs are often set-up quickly at remote sites, the use of wireless communication between components often aids in rapid set-up and teardown of rigs. The radiofrequency (RF) spectrum is rapidly becoming saturated due to the every growing demand for bandwidth by wireless smart devices and, RF technologies such as 2G, 3G and 4G are facing challenges to accommodate the exponential increase in the number of smart devices connected to the internet. Moreover, RF communication suffers from electromagnetic interference, safety issues due to electromagnetic radiation, and privacy and security concerns due to the possibility of signals being intercepted by an outside party.

This disclosure also describes using a wireless visible light communication (VLC) method known as optical camera communication (OCC) to transfer data between existing and new sensors on a rig and cameras. OCC has many advantages over RF communication such as an unused, unlicensed/unregulated optical spectrum for communication, having no electromagnetic interference and a well-defined coverage zone that results in inherent security, low power consumption due to the use of LEDs and user safety since there is no electromagnetic radiation during transmission.

The use of low power LEDs can be used to indicate and transfer sensor output to cameras. LEDs can be driven by very low currents to provide high intensity light and they have long lifetimes. LEDs are a feasible form of communication since they can be turned on and off at higher frequencies than the critical flicker frequency, which enables data transmission not visible by the human eye. This permits the transmission of data in binary code sequences. Moreover, LEDs can be switched to different intensity levels and the ability of LEDs to change colors can also be utilized to transmit data by reproducing a broad array of color patterns on the display of the LED array.

FIG. 1 is a partial schematic perspective view of an example rig system 100 for drilling and producing a well. The well can extend from the surface through the Earth to one or more subterranean zones of interest. The example rig system 100 includes a drill floor 102 positioned above the surface 101, a wellhead 104, a drill string assembly 106 supported by the rig structure and travelling block, a fluid circulation system 108 to filter used drilling fluid from the wellbore and provide clean drilling fluid to the drill string assembly 106, and a monitoring system 200 (including an image sensor 202 and an onsite edge gateway 204, and described in more detail later) to monitor in real time one or more components on the rig system 100. For example, the example rig system 100 of FIG. 1 is shown as a drill rig capable of performing a drilling operation with the rig system 100 supporting the drill string assembly 106 over a wellbore. The wellhead 104 can be used to support casing or other well components or equipment into the wellbore of the well.

The derrick or mast is a support framework mounted on the drill floor 102 and positioned over the wellbore to support the components of the drill string assembly 106 during drilling operations. A crown block 112 forms a longitudinally-fixed top of the derrick, and connects to a travelling block 114 with a drilling line including a set of wire ropes or cables. The crown block 112 and the travelling block 114 support the drill string assembly 106 via a swivel 116, a kelly 118, or a top drive system (not shown). Longitudinal movement of the travelling block 114 relative to the crown block 112 of the drill string assembly 106 acts to move the drill string assembly 106 longitudinally upward and downward. The swivel 116, connected to and hung by the travelling block 114 and a rotary hook, allows free rotation of the drill string assembly 106 and provides a connection to a kelly hose 120, which is a hose that flows drilling fluid from a drilling fluid supply of the circulation system 108 to the drill string assembly 106. A standpipe 122 mounted on the drill floor 102 guides at least a portion of the kelly hose 120 to a location proximate to the drill string assembly 106. The kelly 118 is a hexagonal device suspended from the swivel 116 and connected to a longitudinal top of the drill string assembly 106, where the kelly 118 transmits rotary motion and torque to the drill string assembly 106 as the rotary table (306 of FIGS. 3A-3B, described later) of the drill string assembly turns.

In the example rig system 100 of FIG. 1, the drill string assembly 106 is made up of drill pipes 128 with a drill bit (not shown) at a longitudinally bottom end of the drill string. The drill pipe can include hollow steel piping, and the drill bit can include cutting tools, such as blades, discs, rollers, cutters, or a combination of these, to cut into the formation and form the wellbore. The drill bit rotates and penetrates through rock formations below the surface under the combined effect of axial load and rotation of the drill string assembly 106. The kelly 118 also transmits rotary motion, torque and weight-on-bit to the drill bit. In some implementations, the kelly 118 and swivel 116 can be replaced by a top drive that allows the drill string assembly 106 to spin and drill. The rig system 100 can also include a drawworks 124 and a deadline anchor 126, where the drawworks 124 includes a winch that acts as a hoisting system to reel the drilling line in and out to raise and lower the drill string assembly 106 by a fast line 125. The deadline anchor 126 fixes the drilling line opposite the drawworks 124 by a deadline 127, and can measure the suspended load (or hook load) on the rotary hook. The weight on bit (WOB) can be measured when the drill bit is at the bottom the wellbore. The rig system 100 also includes a blowout preventer 110 positioned at the surface 101 of the well and below (but often connected to) the drill floor 102. The blowout preventer 110 acts to prevent well blowouts caused by formation fluid entering the wellbore, displacing drilling fluid, and flowing to the surface at a pressure greater than atmospheric pressure. The blowout preventer 110 can close around (and in some instances, through) the drill string assembly 106 and seal off the space between the drill string and the wellbore wall.

During a drilling operation of the well, the circulation system 108 circulates drilling fluid from the wellbore to the drill string assembly 106, filters used drilling fluid from the wellbore, and provides clean drilling fluid to the drill string assembly 106. The example circulation system 108 includes a fluid pump 130 that fluidly connects to and provides drilling fluid to the drill string assembly 106 via the kelly hose 120 and the standpipe 122. The circulation system 108 also includes a flow-out line 132, a shale shaker 134, a settling pit 136, and a suction pit 138. In a drilling operation, the circulation system 108 pumps drilling fluid from the surface, through the drill string assembly 106, out the drill bit and back up the annulus of the wellbore, where the annulus is the space between the drill pipe and the formation or casing. The density of the drilling fluid is intended to be greater than the formation pressures to prevent formation fluids from entering the annulus and flowing to the surface and less than the mechanical strength of the formation, as a greater density may fracture the formation, which creates a path for the drilling fluids to go into the formation. Apart from well control, drilling fluids can also cool the drill bit and lift rock cuttings from the drilled formation up the annulus and to the surface to be filtered out and treated before it is pumped down the drill string assembly 106 again. The drilling fluid returns in the annulus with rock cuttings and flows out to the flow-out line 132, which connects to and provides the fluid to the shale shaker 134. The flow line is an inclined pipe that directs the drilling fluid from the annulus to the shale shaker 134. The shale shaker 134 includes a mesh-like surface to separate the coarse rock cuttings from the drilling fluid, and finer rock cuttings and drilling fluid then go through the settling pit 136 to the suction pit 136. The circulation system 108 includes a mud hopper 140 into which materials (for example, to provide dispersion, rapid hydration, and uniform mixing) can be introduced to the circulation system 108. The fluid pump 130 cycles the drilling fluid up the standpipe 122 through the swivel 116 and back into the drill string assembly 106 to go back into the well.

The example rig system 100 can take a variety of forms and include a number of different components. For example, the drillstring assembly 106 can include additional or different components than the example shown in FIG. 1. Similarly, the circulation system 108 can include additional or different components than the example shown in FIG. 1.

The example rig system 100 also includes monitoring system 200 that monitors processes on the rig system, such as drilling operations using components of the drill string assembly 106, continuously inspects the processes, and proposes (and in some instances, acts on) a remedial action in instances where an operating condition of the processes has a failure mode greater than a failure threshold. The monitoring system includes an image sensor 202, shown schematically in FIG. 1 as a camera, and an on-site edge gateway 204. The image sensor 202 is positioned about the rig, for example, disposed on the rig floor 102 and directed at a component of the drill string assembly 106 positioned on the rig floor 102 to monitor the processes involved with the component. The image sensor 202 provides an image feed, such as one or more images or a video feed, of the component of the drill string assembly 106. The on-site edge gateway 204 is communicably coupled to the image sensor 202, and receives the image feed from the image sensor 202. The image sensor 202 can communicate with the on-site edge gateway 204 in a variety of ways, such as over a wired connection or a wireless connection. For example, a wireless communicable coupling can include Bluetooth, Wi-Fi, Zig-Bee, cellular or near field communication (NFC), a combination of these, or other communication methods. In some examples, a wired communicable coupling can include optical fiber, Power-over-Ethernet, or other wired communication methods.

The processes that the monitoring system 200 can monitor can vary. Example processes can include:

i) Tripping in/out speed while the drill bit is above the bottom of the wellbore and not drilling, by monitoring the drill pipe joints going in and out of a wellbore, travelling block, swivel, kelly or topdrive. Drill pipe joints can be approximately 20% larger than drill pipes in the drillstring assembly and can be detected in an image and extracted for analysis;

ii) The rate of penetration when the drill bit is at the bottom penetrating through rock formations by monitoring the drill pipe joints going in and out of a wellbore, travelling block, swivel, kelly or topdrive;

iii) Revolutions per minute of drill pipe when the drill bit is at the bottom penetrating through the rock formations by monitoring the drill pipe joints going in and out of a wellbore, travelling block, swivel, kelly or topdrive;

iv) Analysis of vibration and shock of the drillstring assembly not visible to the human eye. The monitoring system can be utilized to analyze deflection, displacements and movement of the drillstring assembly by for example analyzing the pixels in the image;

v) Analysis of sound of the drilling process and isolate the many different drilling processes occurring both downhole and at the surface and enhance specific sounds to determine specific drilling processes. This has far reaching significances such as recognizing and predicting the formations being drilled due to the sound made by the drill bit penetrating through different formations, travelling up the drillstring to the surface, and being analyzed by the IoT system;

vi) Analysis of drillstring eccentricity by monitoring the movement of the drillstring on the horizontal plane from an image acquired from the top of the drill floor;

vii) Analysis of tension in the drilling and fast lines and the deadline by monitoring the tension of the drilling lines and the deadline independent of the direction of the travelling block movement and the tension in the fast line. Moreover, cameras can also be utilized to observe drawworks and deadline anchors and the make sure the drums and the steel spools are functioning as expected;

viii) The flow in/out lines and the trip tank to monitor the level of drilling fluid flowing in and out of the wellbore;

ix) The flow in/out lines to monitor the instantaneous flow velocity of the drilling fluid flowing in and out of the wellbore. This can be achieved by addition of particles to the fluid flow in a minimally-invasive way, for example, at the flow out line near the bell nipple, and utilizing a optical method such as particle image velocimetry (PIV) to visualize the flow and calculating the flow speed. In this case the particles can be tracer particles with optical properties so they are illuminated and easily visible to the camera. The flow velocity can also be monitored by installing a wheel with reflectors at the flow out line, touching or half-submerged in the fluid, where the cameras can then monitor the velocity of the wheel turning;

x) The flow in/out lines to monitor the pH of the drilling fluids with the aid of PIV;

xi) The shale shaker to monitor the magnitude of formation cuttings as well as identify the type of cuttings and establish the specific downhole rock formations being drilled;

xii) The chemical tank between the settling and the suction pit to monitor the type and the amount of chemicals being added to the drilling fluid. Ideally the chemical additive system will be an automated with different chemical tanks that have level indicators visible to the camera; and xiii) The mud mixing hopper to monitor the mixing and addition of chemicals and other additives to the drilling fluid. Ideally this will be an automated system with different chemical tanks that have level indicators visible to the camera, located above, and connected to, the venturi pipe in the mud hopper.

Monitoring one or more of the above processes by the monitoring system 200 can be used to identify some of the challenges encountered during drilling, such as stuck pipe, lost circulation, well control, drilling dynamics issues, geomechanics of downhole rock formation, a combination of these, or other challenges.

The image sensor 202 provides process monitoring, and captures an image feed of one or more components on the rig during staging or operation of the component or components. The image sensor 202 can take a variety of forms. For example, the image sensor 202 can include a camera, such as a camera that is smart, waterproof, intrinsically safe, explosion proof, high-resolution, wireless, or a combination of these features. In some instances, the image sensor 202 includes an optical filter, such as an ultraviolet (UV) filter, infrared (IR) filter, a combination of these, or another filter type. The image sensor 202 is a non-invasive image capture of the component, and provides the image feed to the on-site edge gateway 204. While the monitoring system 200 of FIG. 1 shows only one image sensor 202, the monitoring system can include more than one image sensor, such as a plurality of cameras positioned about the drill string component. In some implementations, a plurality of image sensors can provide an image feed that represents a three-dimensional model of the component or other components in a process to the on-site edge gateway 204. For example, multiple image sensors 202 can be positioned evenly or unevenly about a component to provide an image feed to the on-site edge gateway 204 representative of a three-dimensional view of the component. The image sensor 202 can be disposed anywhere about the rig system 100, given that the image sensor 202 is directed at the component to provide an image feed of the component. In some implementations, the image sensor 202 is mounted on a movable support that can move and position the image sensor 202, for example, to follow a particular component over multiple views or during movement of the component, switch from one component to another, or a combination of these. In some implementations, the monitoring system 200 includes an audio sensor, in addition to or instead of the image sensor 202, to provide an audio feed to the on-site edge gateway 204.

The on-site edge gateway 204 is positioned on-site, or locally, on the rig, and acts as an edge/fog computing system. In other words, the on-site edge gateway 204 includes computing components located on-site, in that the computing components that perform the analysis of the image feed from the image sensor(s) 202 are located locally on the rig. This edge/fog computing setup of the on-site edge gateway 204 localizes processing and analysis at the on-site edge gateway 204, for example, without need for transferring information and data or outsourcing analysis to a remote computing system in order to function. The on-site edge gateway 204 includes one or more processors and a non-transitory computer-readable storage medium used in the reception and analysis of the input from the image sensor 202, as described in more detail later. The image sensor 202 provides the image feed of the one or more well components to the on-site edge gateway 204, and the on-site edge gateway 204 identifies present or potential failures in the integrity of the component(s). The on-site edge gateway 204 can also propose (and in some instances, act on) a fix for the identified failures in the component(s), all in substantially real time. Real time, for example, can mean that the image feed is provided continuously and substantially instantaneously from the image sensor 202 to the on-site edge gateway 204, and the identification and determination of a particular operating parameter, operating condition, and failure mode of a feature of the component occurs substantially instantaneously.

The on-site edge gateway 204 receives the image feed from the image sensor(s) 202 and performs a processing and analysis of the image feed. The processing and analysis of the image feed includes identifying an operating parameter of the targeted well component, generating an operating condition of the well component from the operating parameter, and in some instances, determining that the operating condition meets a failure threshold of the component. For example, the operating parameter can be an integrity of the well component, an orientation or position of the well component, or another parameter of the well component. The operating condition can include a type of wear, tear, or failure of the component. For example, the operating condition can include the presence of a crack, gouge, dent, pitting, corrosion, a combination of these, or other wear and tear of a feature of the well component. Determining that the operating condition meets a failure threshold of the component can include a determination that the particular type of wear, tear, or failure of the component is significant enough to prompt a repair, replacement, or other remedial action of the component. This significance limit is the failure threshold of the component, and can be identified based on test data and experimentation. For example, if the size (for example, width, length, or depth) of an identified crack, gouge, or dent is greater than a set of size dimensions defining the failure threshold, then the component can be determined to require repair, replacement, or another remedial action. If the size of the identified crack, gouge, or dent is less than the set of size dimensions defining the failure threshold, then the component can be determined not to require repair, replacement, or other remedial action. Based on this determination, the on-site edge gateway 204 can prompt an automation rule, and can send instructions to drive a controllable device, as described in greater detail later.

In some instances where the operating condition of the component meets a failure threshold, the on-site edge gateway 204 can propose, act on, or both propose and act on a remedial action to address the failure of the component. The remedial action can vary based on the significance of the failure.

The well component that the monitoring system 200 inspects can vary, for example, based on the target object of the image sensor 202. In the example rig system of FIG. 1, the image sensor 202 is directed at a component of the drill string assembly 106, such as the drill pipe 128 or drill bit. However, the image sensor 202 can be directed at and provide an image feed of a different component of the drill string assembly 106, or of another component on the rig system 100. For example, the well component can include a drill pipes, drill pipe connectors, drill pipe collars, heavy-weight drill pipes and collars, cross over subs, tubulars, stabilizers, packers, drilling jars, downhole motors, reamers, drill bits, drill bit subs, casing components such as casings, liners, casing collars, and casing centralizers, a combination of these components, or other components. In some examples, the image sensor 202 is directed at a component of the wellhead assembly 104, such that the monitoring system 200 inspects and monitors the integrity of a component of the wellhead assembly 104 during operation of the rig system 100.

Figure 2A:
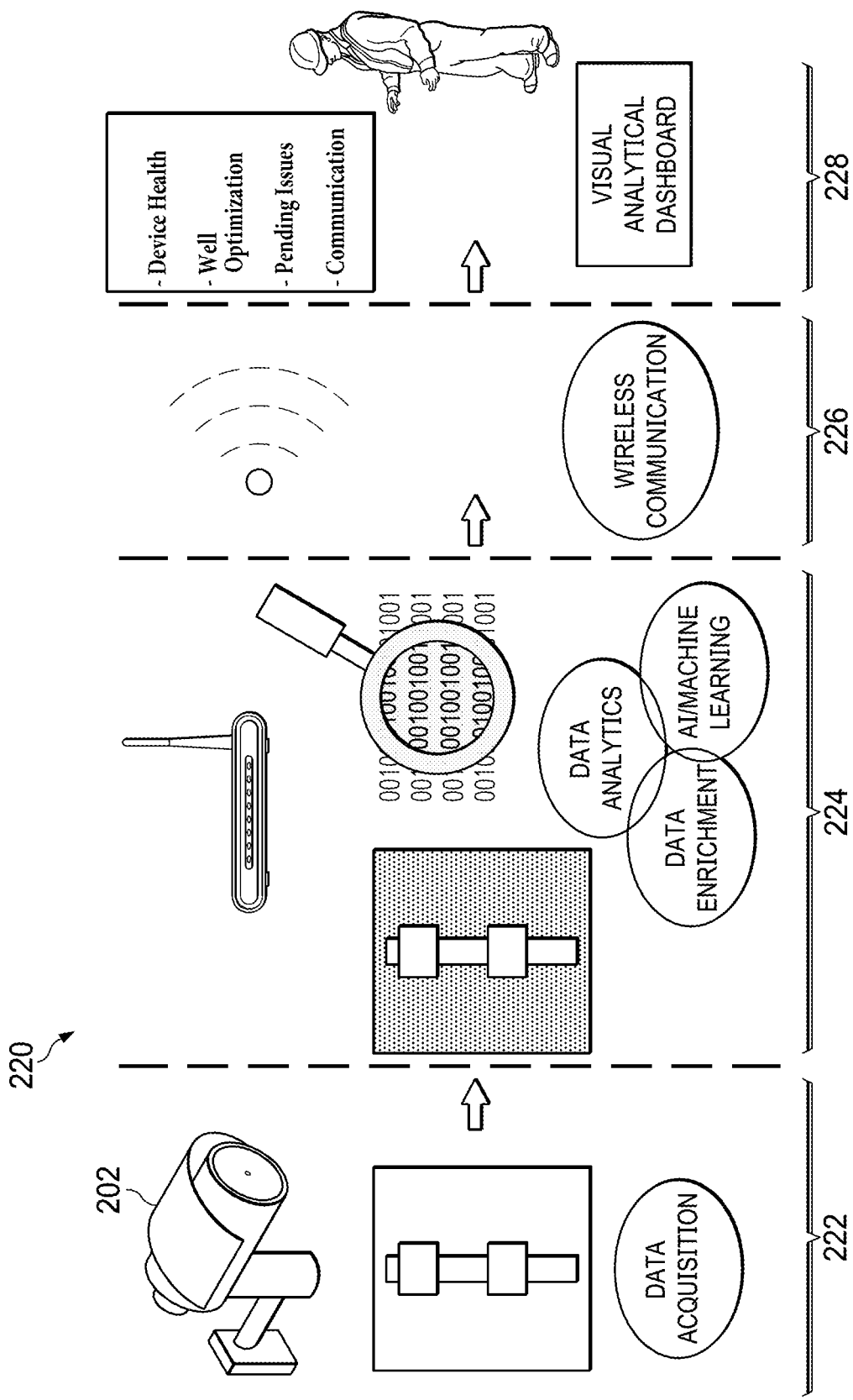
FIG. 2A is a high level system diagram of the subject matter described within this disclosure.

FIG. 2A is a high level system diagram 220 of the subject matter described within this disclosure. In general, the monitoring system 200 includes the data monitoring/acquisition portion 222, that can include a camera 202 recording images of various rig equipment on the rig system 100. The system also has an analytics portion 224 where the images are converted into an image stream that is processed by the on-site edge gateway 204. The processed image stream can be sent wirelessly, as shown in wireless communication portion 226, to a visual display portion 228, such as a visual analytical dashboard for display to a well operator. More details on the on-site edge gateway 204 are described later within this disclosure. The on-site edge gateway 204 can the act on the processed data through various automation systems located on-site. As necessary, the on-site edge gateway can truncate the processed data and send the truncated data to an offsite location for historical trending and analysis. Such a process reduces bandwidth requirements of the on-site location.

The system described within this disclosure can be used monitoring and analyzing a number of operations on a drilling rig. In some implementations, the system is able to identify and provides an operator with a list of issues. In addition to providing the list of issues, the system can rank the issues in terms of how critical each issue is. The system is capable of providing an operator a set of actions for all, some, or none of the issues depending on which issues are present. In some implementations, the system can chooses a best action out of the provided set of actions. In some implementations, the system can help guide an operator through steps to solve a detected problem. In some implementations, the system can obtains approval from the operator to execute a specific action to solve a problem. In some implementations, the system executes a specific action automatically to solve a problem and then informs the operator. In some implementations, the system can execute a specific action automatically to solve a problem and only inform the operator if the operator requests as such. In some implementation, the system has fully automated decision making capabilities.

The general steps involved in image processing are image acquisition, pre-processing and image enhancement, image segmentation, feature extraction, image classification and target detection. Detection of a specific object, target, feature or condition in a stationary or dynamic setting can be performed by various image processing techniques such as pattern recognition, edge detection, wavelets, pixelation, texture, connectivity component based approach, principle and independent component analysis, descriptors based methods, linear filtering, anisotropic diffusion and traditional grey-level segmentation or thresholding methods. Edge/fog computing with machine learning and artificial intelligence has enabled the wide adoption of image processing in various industries, including drilling, where algorithms can now be constructed to rapidly process real-time datasets.

Figure 2B:
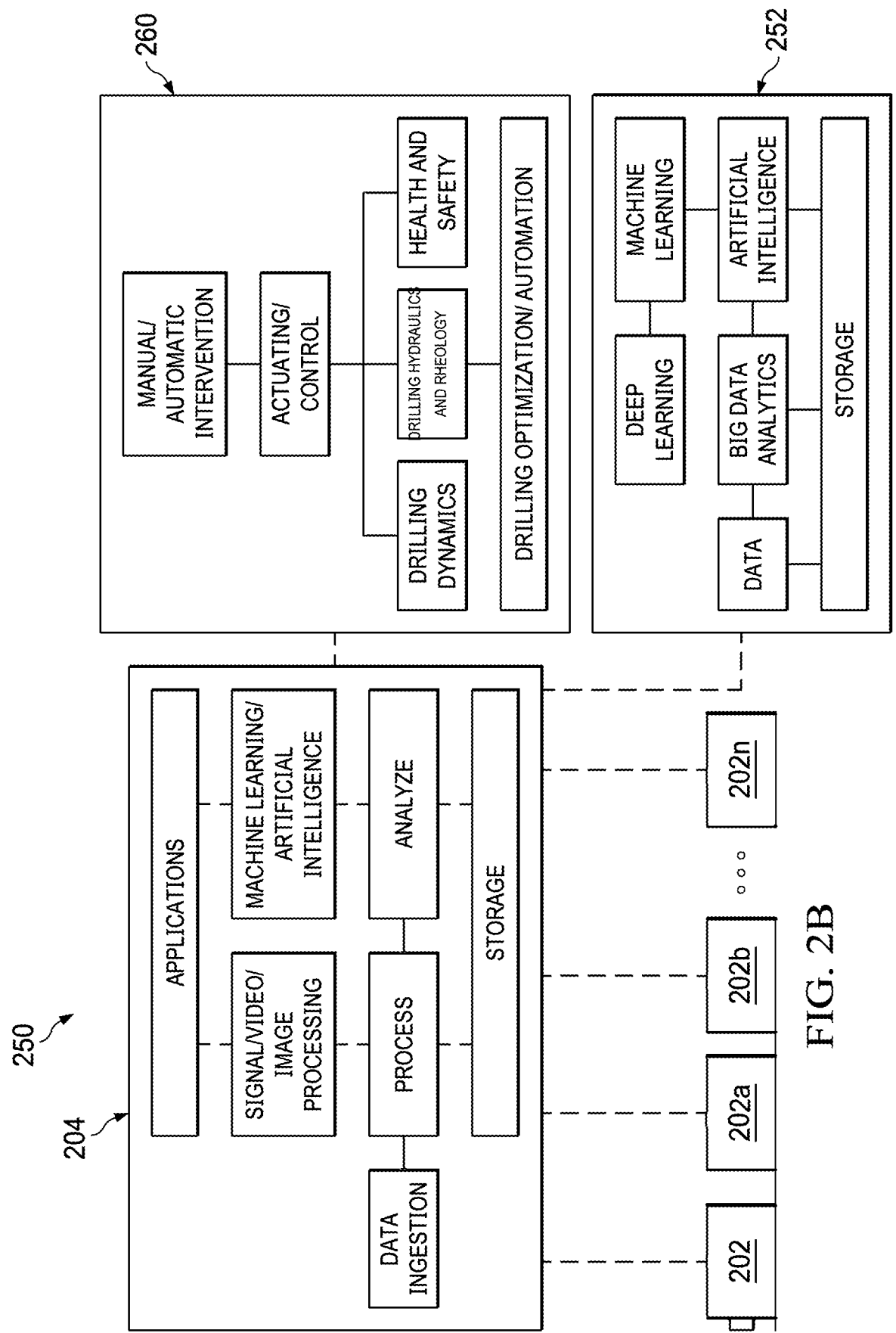
FIG. 2B is a schematic diagram of the example monitoring system of FIG. 1, including the image sensor and the edge gateway.

FIG. 2B is a schematic diagram 250 of the example monitoring system 200, including the image sensor 202 and the edge gateway 204. The monitoring can include additional image sensors (such as sensors 202a, 202b, . . . 202n). The additional sensors can include one or more additional image sensors, one or more audio sensors, or any another sensor on the surface of a drilling rig, such as pressure, temperature, torque, weight-on-bit, rotary speed, rate of penetration, flow rate or fluid rheology, and downhole sensors as part of a measurement-while-drilling or logging-while-drilling sub. The example scenarios of the schematic process diagram 250 of FIG. 2B, which provide example detection, failure, and prediction models of well processes or components, can be performed in a private cloud 252 of the example monitoring system 200. The onsite edge gateway 204 can be communicably coupled to the private cloud 252, which can be used to provide or store data acquired by the onsite edge gateway 204. The cloud 252 can be used to store large amounts of data, for example, terabytes of data. Various operations can be performed in the cloud 252 separately from the onsite edge gateway 204. For example, deep learning algorithms, machine learning algorithms, artificial intelligence algorithms, big data analytics, or any combination of these can be performed in the cloud 252. In some implementations, one or more optimization parameters can be determined by any one or more of such operations on the private cloud 252, and the one or more optimization parameters can be transmitted to the onsite edge gateway 204 to improve operations and calculations performed by the onsite edge gateway 204. The operations performed in the cloud 252 need not occur locally on the rig.

The edge gateway 204 can include a computer system having a data ingestion module to acquire the data from the image sensor 202, or any other sensor, on the rig floor 102. The raw data can be sent to a process layer, where one or more processing operations can be performed. For example, the processing operations in the process layer for signal, video, or image processing can include analog or digital signal processing, pattern recognition, edge detection, wavelet transform processing, pixelated processing, image texture processing, component-based approach connectivity processing, principle component analysis, independent component analysis, descriptors based methods, linear filtering, anisotropic diffusion operations, traditional grey-level segmentation, image thresholding methods, or any combination of these operations. The processed data can be sent to an analysis module of the gateway 204, where the analysis module can perform one or more analysis operations. For example, the analysis operations in the analysis module can include machine learning algorithms or artificial intelligence algorithms. Such algorithms can be based on the developed detection, failure, and prediction models utilized to obtain the condition of a well component. Machine learning/artificial intelligence algorithms can be based on data driven, physics, or hybrid models (or a combination of these), which are employed to identify hidden patterns in data and make predictions to mitigate/prevent problems associated with drilling such as stuck pipe, lost circulation, well control, drilling dynamics issues, geomechanics of downhole rock formations, or a combination of these.

The onsite edge gateway 204 can communicate with and actuate processes or components on the rig system 100 or elsewhere. For example, the example schematic diagram 250 includes a rig site actionable insights module 260 connected to the onsite edge gateway 204. Actionable insights of the actionable insights module 260 gained from the onsite edge gateway 204 can be used for manual or automatic intervention for actuation, control, or triggering of processes for drilling dynamics, drilling hydraulics and rheology, health and safety, on-site maintenance, on-site production, manufacturing processes in off-site factories, coordination mechanisms for transportation and logistics, or a combination of these. The actionable insights, the processed data in storage, or both, can also be sent to the private cloud 252 for big data analytics and deep learning, as well as for storage of historical data. The detection, failure, and prediction models can be updated regularly to find dependencies and discover patterns and insights in the machine learning data sets. New data that the image sensor(s) 202 acquires on drilling rigs, such as the example rig system 100 of FIG. 1, and in warehouses are utilized to revise, re-train, and re-test as desired or required.

Figure 3A:
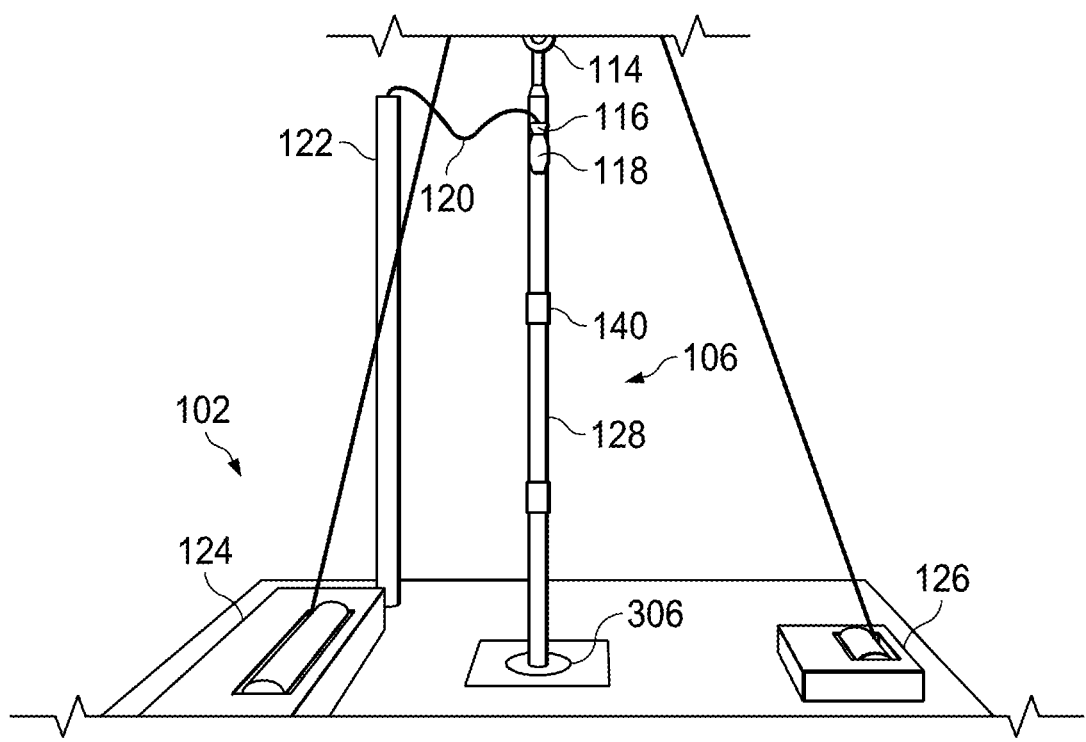
FIGS. 3A-3B are perspective schematic diagrams of an example rig floor used for drilling operations.
Figure 3B:
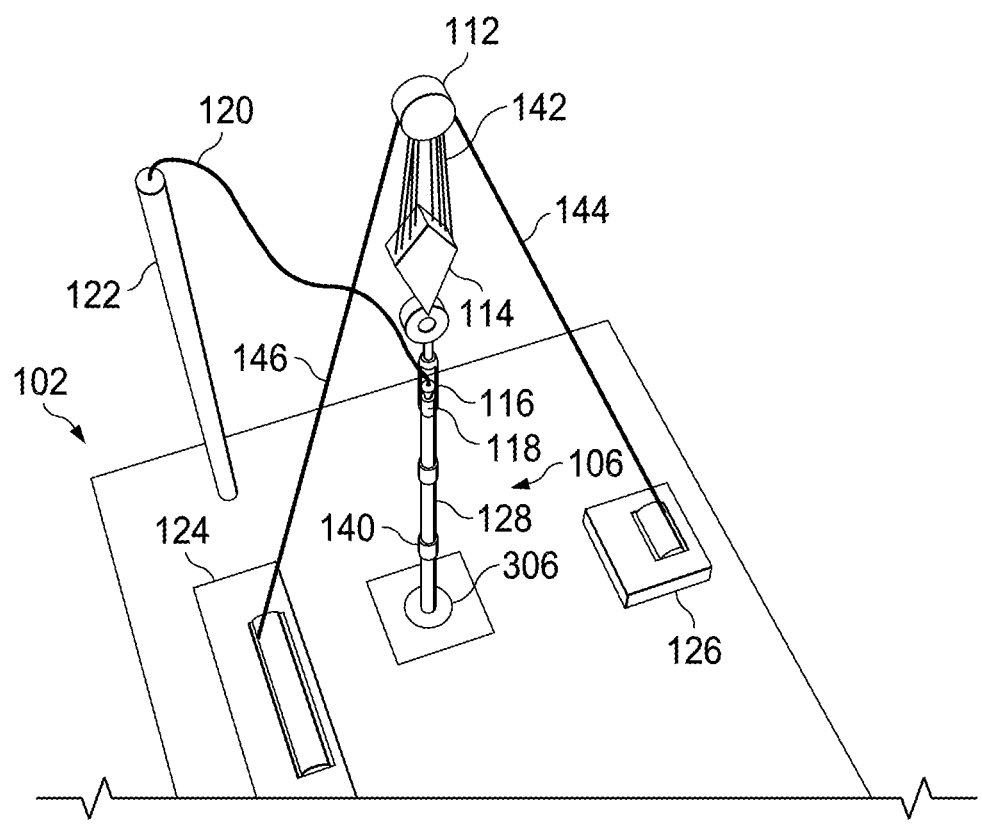

FIGS. 3A-3B show different areas of the drilling rig system 100 at various camera angles to demonstrate the ability of cameras to be installed in a non/minimally invasive manner anywhere on a rig at, any angle, to observe a multitude of operations on a rig system 100. For example, the system can observe tripping in/out speed while the drill bit is above the bottom of the wellbore and not drilling by monitoring the drill pipe joints 140 going in and out of a wellbore, travelling block 114, swivel 116, kelly 118, or topdrive. Drill pipe joints 140 are approximately 20% larger than the main length of drill pipes 128 in the drillstring assembly 106 and can be detected in an image and extracted for analysis.

The rate of penetration when the drill bit is at the bottom penetrating through rock formations can be determine by monitoring the drill pipe joints 140 going in and out of a wellbore, travelling block 114, swivel 116, kelly 118, or topdrive. Revolutions per minute of drill pipe 128 can be determined when the drill bit (not shown) is at the bottom penetrating through the rock formations by monitoring the drill pipe 128, the drill pipe joints 140, or both, rotating and going in and out of a wellbore, travelling block 114, swivel 116, kelly 118, or topdrive.

Analysis of vibration and shock of the drillstring assembly 106 not visible to the human eye can be performed. The system can be used to analyze deflection, displacements, and movement of the drillstring assembly 106 by, for example, analyzing the pixels in the image. Analysis of drillstring eccentricity can be performed by monitoring the movement of the drillstring on the horizontal plane from an image acquired from the top of the drill floor, as shown in FIG. 3B.

Analysis of tension in the drilling line 142, fast line 146, and the deadline 144 by monitoring the tension of the drilling lines 142 and the deadline 144 independent of the direction of the travelling block movement and the tension in the fast line 146. Moreover, cameras can also be utilized to observe drawworks and deadline anchors and the make sure the drums and the steel spools are functioning as expected.

Alternatively or in addition, analysis can be performed on the sound of the drilling process. Such analysis can isolate the many different drilling processes occurring both downhole and at the surface and enhance specific sounds to determine specific drilling processes. This has far reaching significances such as recognizing and predicting the formations being drilled due to the sound made by the drill bit penetrating through different formations, travelling up the drillstring assembly 106 to the surface, and being analyzed by the monitoring system 200.

Figure 4:
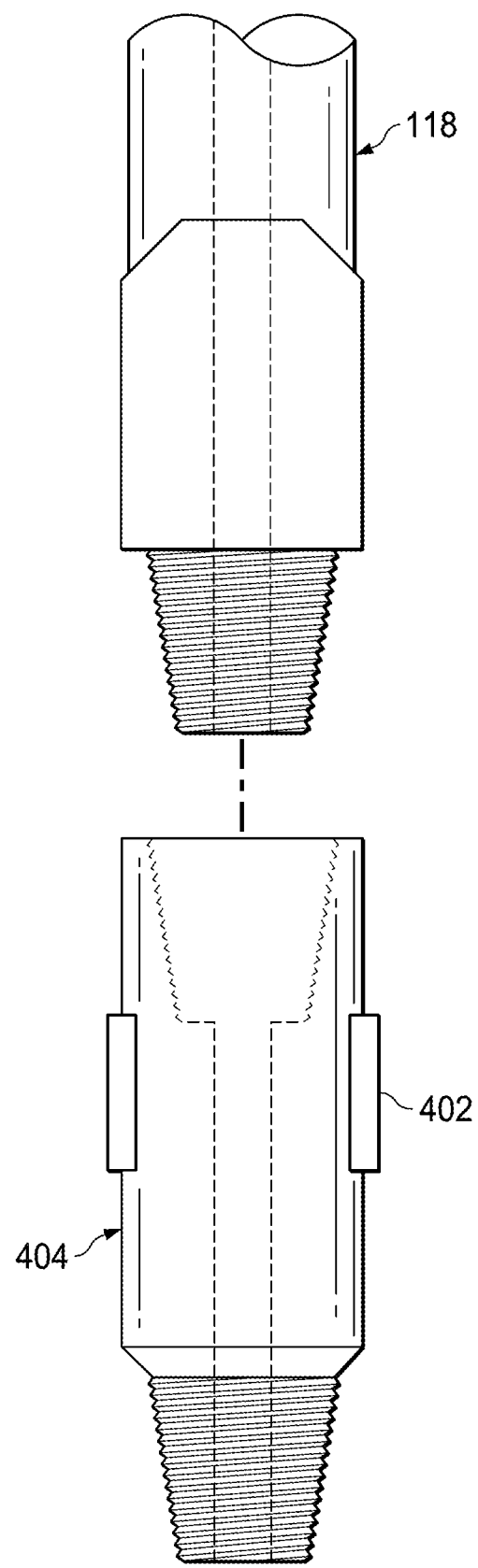
FIG. 4 is a side schematic diagram of an example kelly and kelly sub that can be used with aspects of this disclosure.

FIG. 4 shows a target 402 attached to the kelly saver sub 404, which is located below a topdrive and at the top of the drillstring assembly 106. The target 402 can be any reference point, such as a reflector or light emitting diode (LED), attached to serve as an objected to be detected when processing an image. Attaching a target 402 can be an alternative or an addition to the direct monitoring of the drillstring components previously explained.

Figure 5A:
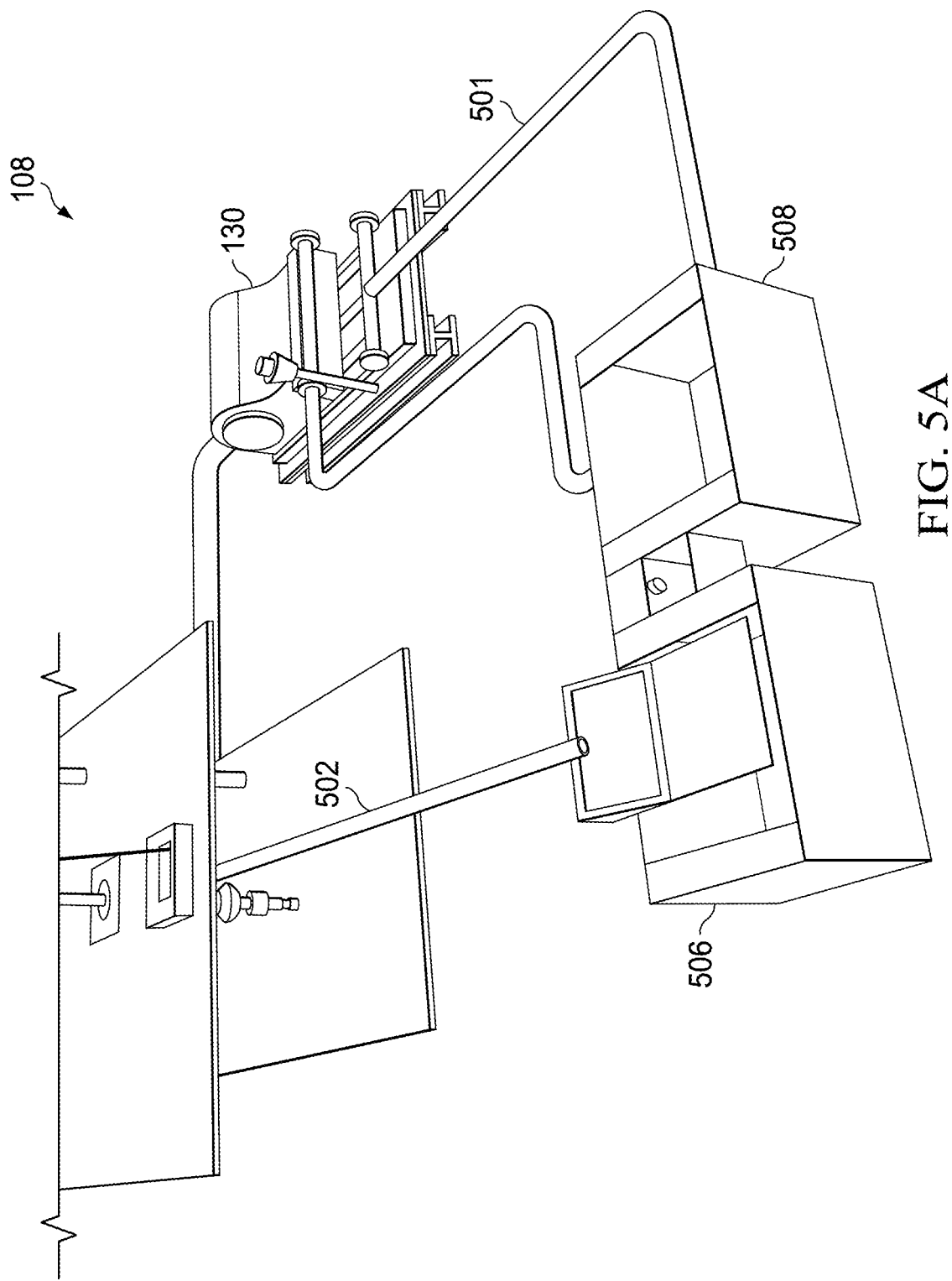
FIGS. 5A-5F are perspective schematic diagrams of example rig system components that can be used with aspects of this disclosure.

FIG. 5A shows a drilling subsystem that includes fluid circulation system 108 on a rig system 100. The drilling fluid flows out of the annulus through the flow out line 502 into the shale shaker 504 (FIG. 5C) to filter out large formation cuttings. The filtered drilling fluid then goes through a settling pit 506 into a suction pit 508 and suction 501 to be cycled by the fluid pump 130 back into the drillstring assembly 106 through the standpipe 122.

Cameras can be installed at various points to monitor various aspects of operation. For example, cameras can be positioned to view the flow in/out lines 502 the settling pit 506, the suction tank 508, or a combination to monitor the level of drilling fluid flowing in and out of the wellbore. In some implementations, the fluid circulation system 108 can include valving that can be acted upon by the system 200. For example, a valve can include a drivable device, such as an actuator, that can be controlled, driven, or both by the system 200. In some implementations, the system 200 can act upon the fluid pump 130, for example, adjusting a motor controller or variable frequency drive.

Figure 5B:
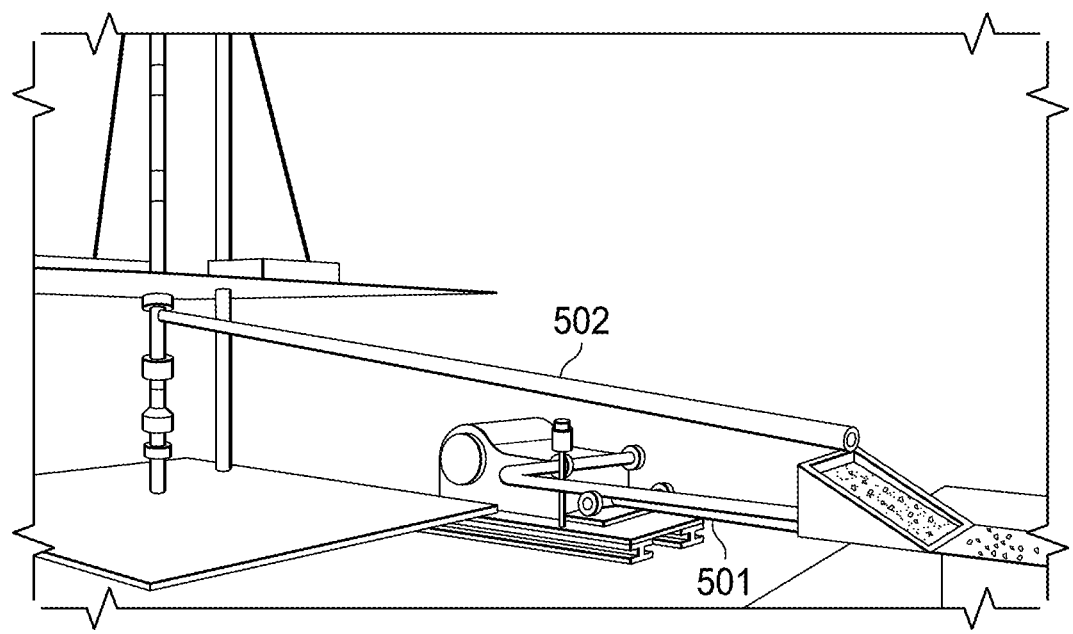

Alternatively or in addition, shown in FIG. 5B, the flow in lines (suction 501), flow out lines (discharge 502), or both can be used to monitor the instantaneous flow velocity of the drilling fluid flowing in and out of the wellbore either directly or through an existing sensor such as a paddle-type drilling fluid flow sensor. This can be achieved by addition of particles to the fluid flow, for example, at the flow out line near the bell nipple, and utilizing an optical method such as particle image velocimetry (PIV) to visualize the flow and calculating the flow speed. In this case the particles can be tracer particles with optical properties so they are illuminated and easily visible to the camera. The flow velocity can also be monitored by installing a wheel with reflectors at the flow out line, touching or half-submerged in the fluid, where the cameras can then monitor the velocity of the wheel turning. Alternatively or in addition, the flow in/out lines can be used to monitor the pH of the drilling fluids with the aid of PIV. PIV uses tracer particles to visualize the flow and calculate the flow speed. pH can be determined by using specific tracer particles such as fluorescent particles sensitive to pH or functionalized tracer particles sensitive to pH. The change in color or size can then be picked up by the camera and correlated to a pH value.

Figure 5C:
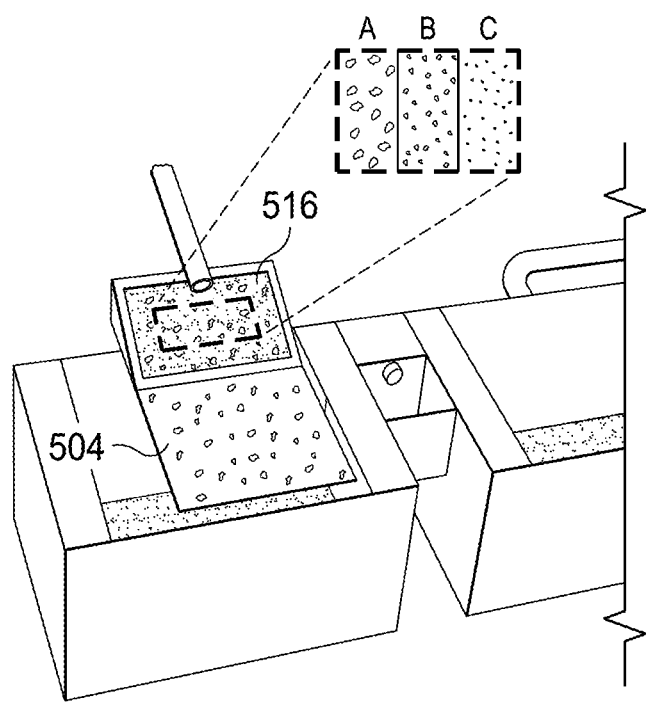

Alternatively or in addition, as shown in FIG. 5C, the shale shaker can be observed to monitor the magnitude of formation cuttings 516 as well as identify the type of cuttings and establish the specific downhole rock formations being drilled. In some implementations, the system 200 can act upon the drawworks 124 to adjust a weight-on-bit based on the observed cuttings 516. For example, the drawworks 124 can include a drivable device, such as a motor driver, that can be controlled, driven, or both by the system 200.

Figure 5D:
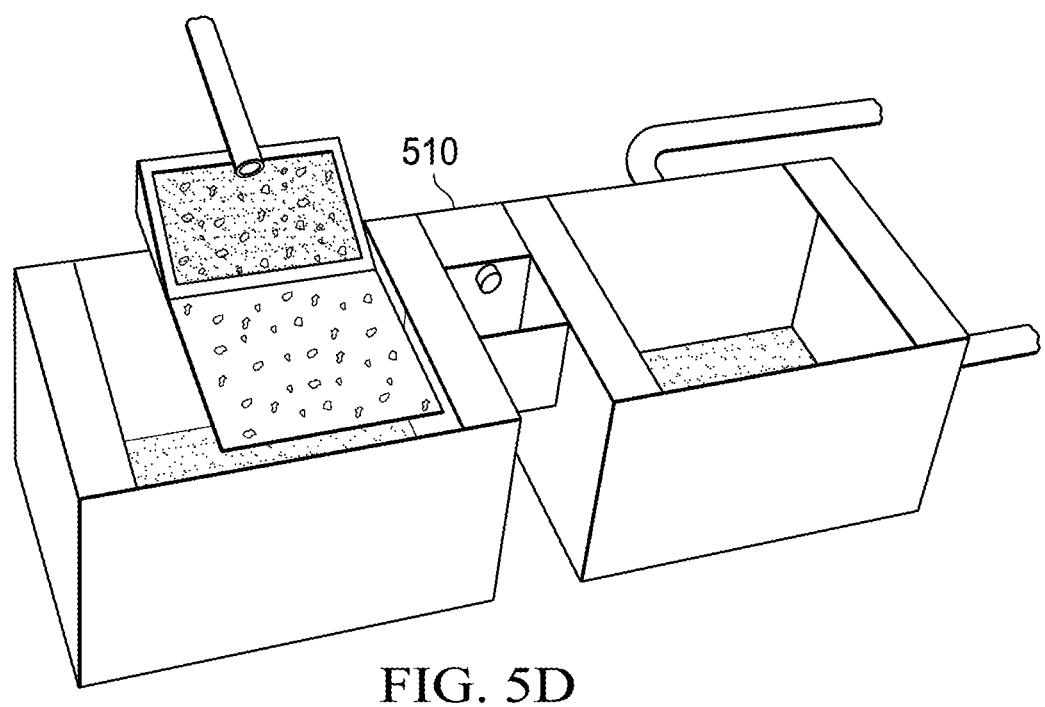

Alternatively or in addition, as shown in FIG. 5D, the chemical tank 510 between the settling pit 506 and the suction pit 508 can be observed to monitor the type and the amount of chemicals being added to the drilling fluid. In some implementations, the chemical additive system is automated with different chemical tanks that have level indicators visible to the camera. In some implementations, the system can monitor and distribute the chemicals. In some implementations, the system 200 can act upon the chemical tanks 510 by adjusting dosage pumps, valves, or a combination, in response to the observed chemical levels. For example, the pumps, valves, or both can include a drivable device, such as a motor driver or valve actuator, that can be controlled, driven, or both by the system 200.

Figure 5E:
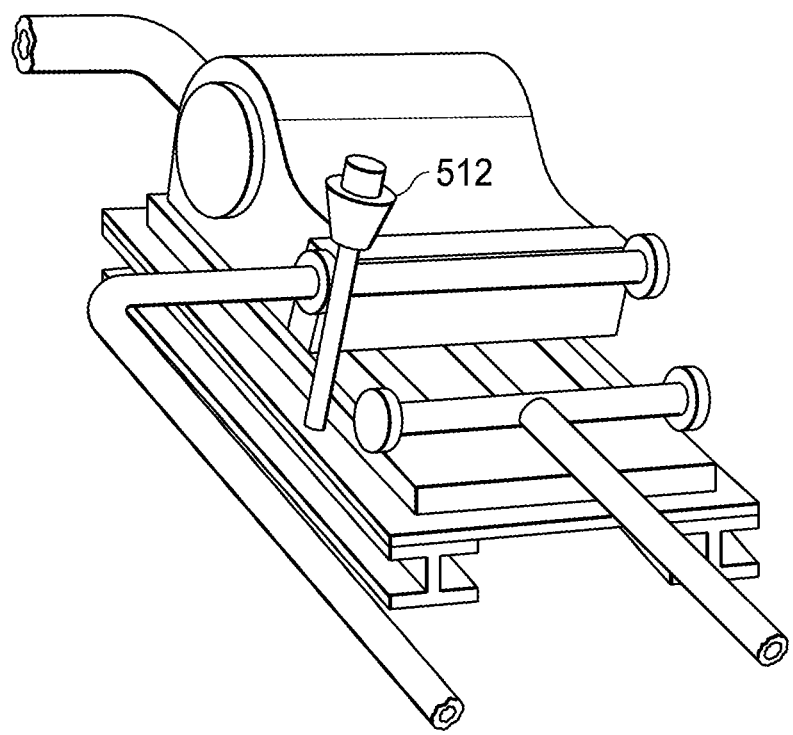

Alternatively or in addition, as shown in FIG. 5D and FIG. 5E, the mud mixing hopper 512 can be observed in order to monitor the mixing and addition of chemicals and other additives to the drilling fluid. In some implementations, the mixing hopper 512 is an automated system with different chemical tanks that have level indicators visible to the camera, located above, and connected to, the venturi pipe in the mud hopper. In some implementations, the system 200 can act upon the hopper 512 by adjusting dosage pumps, mixing motor, valves, or a combination, in response to the observed chemical levels. For example, the pumps, valves, or both can include a drivable device, such as a motor driver or valve actuator, that can be controlled, driven, or both by the system 200.

Figure 5F:
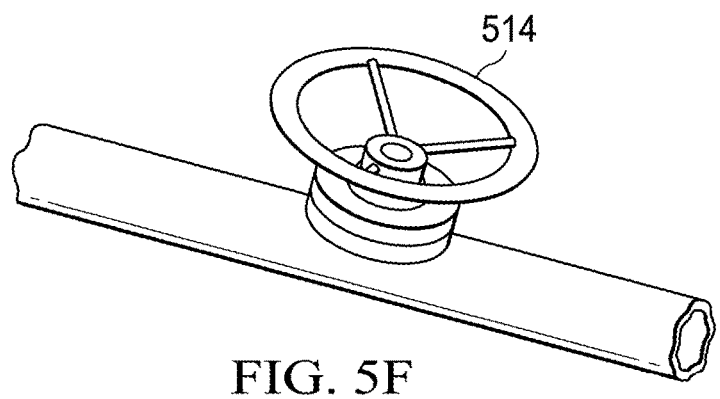

Alternatively or in addition, as shown in FIG. 5F, cameras can be located such that the cameras have a clear view of valves 514 that control flow through the various pipes that connect a drilling fluid hydraulic system. For example, the valves 514 can include a drivable device, such as a valve actuator, that can be controlled, driven, or both by the system 200.

Figure 6:
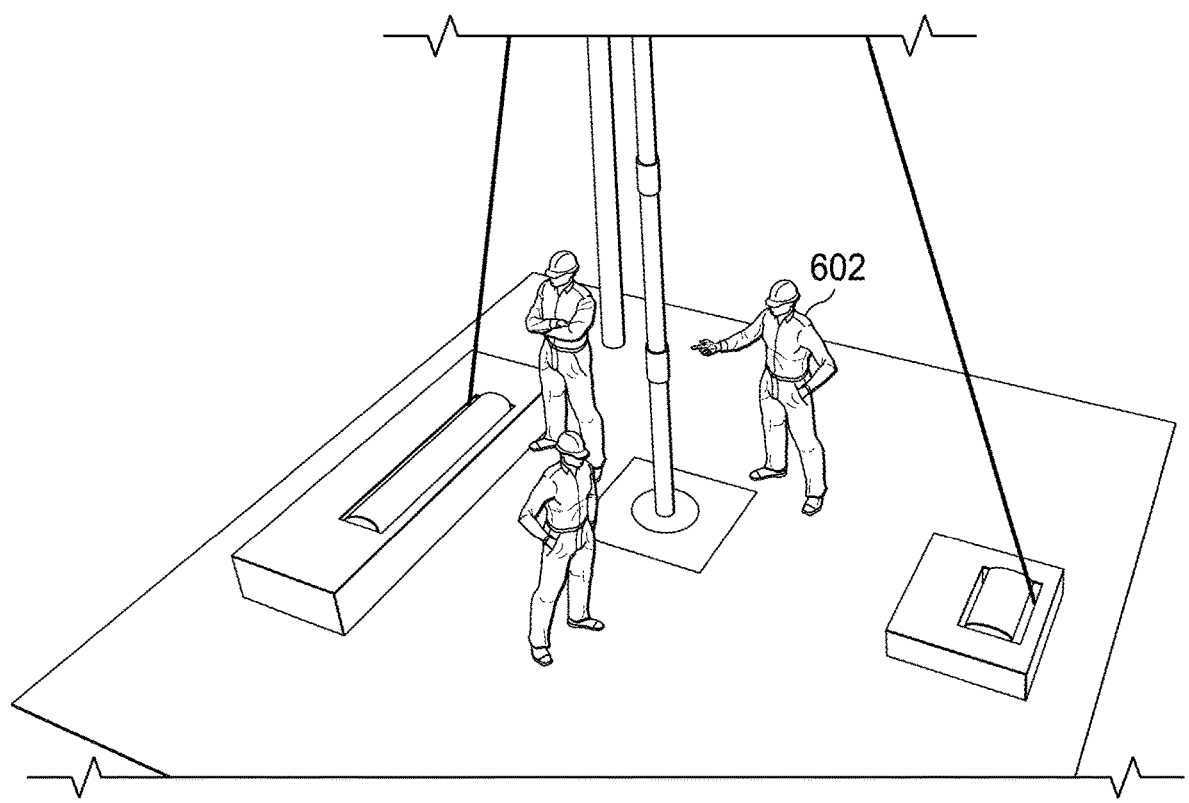
FIG. 6 is a perspective schematic diagram of an example rig floor with workers.

FIG. 6 shows a rig floor with worker 602 present. A camera can be placed to observe the drilling floor for health and safety hazards. Cameras can be utilized to monitor the potential crash risk between the many moving components of a drilling rig and the drilling workers 602, complex machinery and tubular handling safety, personnel tracking in red zones, and monitoring workers 602 for falls and unsafe work behaviors. Infrared cameras can also be utilized to monitor the body temperature and the general wellbeing of the workers 602 on the drill floor.

The following examples are given with respect to FIGS. 3A-6. The following examples describe different scenarios cameras can be utilized to monitor and detect various drilling processes with existing drilling infrastructure and equipment. In the described examples, changes observable by strategically placed cameras are described. The image streams produced cameras can be processed by the gateway, and the gateway can determine operating characteristics and parameters in response to the processing. The gateway can then take an action based on the determined operation parameter or characteristic.

EXAMPLE 1

Stuck Pipe

A stuck pipe an occur due to hole pack-off/bridge, differential sticking or changes in the wellbore geometry. Hole pack-off/bridge situations can be detected at the surface by an erratic and an increase in drag and torque, increase in pressure, gradual decrease in ROP while drilling. The drilling fluid during a hole pack-off/bridge related stuck pipe event will be characterized by an increase in the plastic viscosity and the yield point of the fluid, increase in low gravity solids and a decrease in the drilling fluid density. At the shale shakers there will be a low formation cuttings return rate for penetration rate, erratic cuttings return rate or no cuttings returns. There may be high cuttings return on the fine shaker screen and de-silter/mud cleaner. The types of cuttings observed at the shale shaker can also provide the specific reason for the hole pack off. Soft clay balls and wet clay called 'gumbo' is linked to reactive cuttings, large amount of blocky or large, splintery shale cavings to mechanically stressed shale, large volumes of sands to unconsolidated formations and blocky or angular rock fragments to fractured formations. In the case of differential sticking there will be increasing over pull, slack-off weight or torque to start drillstring movement. Also, there will be an increase in the mud weight, plastic viscosity and low gravity solids along with high API water loss.

EXAMPLE 2

Lost Circulation

Lost circulation occurs due to the partial or the complete loss of circulating drilling mud into a fractured formation. The fractures can be natural or induced, vugular or cavernous, highly permeable or unconsolidated. Lost circulation can be identified by slow return of the drilling fluid, a decrease in the pit volume, excessive hole fill-up or the sudden loss of pressure when the well is shut in.

EXAMPLE 3

Well Control

Well control is the system that manages the uncontrolled flow of formation fluids from the well to the surface. Well control incidents can be identified by an increase in torque and drag, drilling fluid returns and pit volume, decrease in drilling fluid weight density and shale density, contaminants in drilling fluid, change in formation pressures and splintery shale cuttings at the shale shakers.

EXAMPLE 4

Drilling Dynamics

Erratic vibrations, shocks, and oscillations accelerate the fatigue on drillstring components because not all the energy applied to the drillstring system is directed to its intended target, the drill bit. Moreover, erratic vibrations, shocks and oscillations also make the downhole electronic modules more prone to failure. High acceleration in the axial direction can be indicative of the drill bit bouncing due to axial vibrations. High average acceleration in the lateral direction can be indicative of bit whirl, which is caused by drillstring eccentricities resulting in centripetal forces during rotation. Separation between average and peak x and y acceleration values can be indicative of stick-slip of the drill bit, which is due to torsional vibration of the drillstring resulting in alternating stops and intervals of high velocity rotation of the drill bit.

EXAMPLE 5

Geomechanics

Vibration and sound of the drillstring system during the drill bit penetrating through rock formations can be utilized to predict and characterize specific rock formations and their geomechanical features.

Figure 7A:
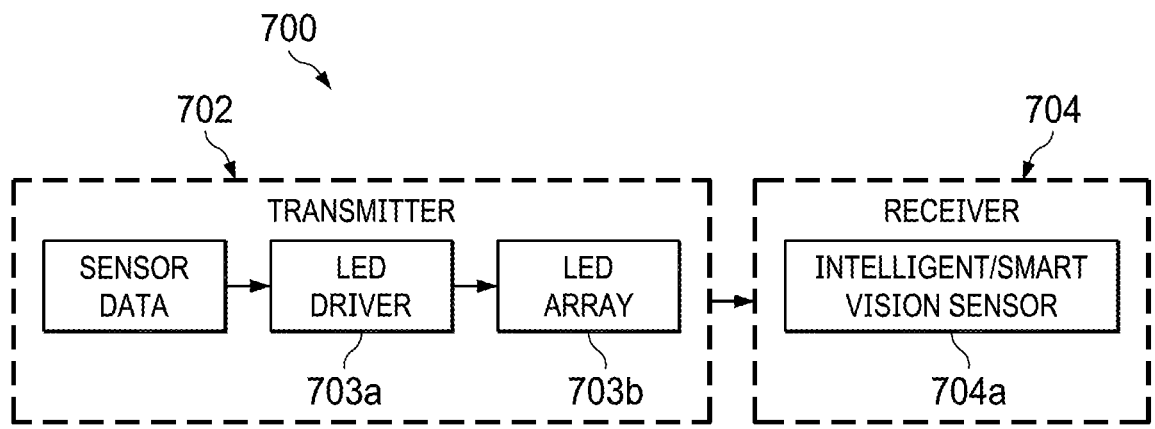
FIG. 7A is a block diagram of an example visible light communication system that can be used with aspects of this disclosure.
Figure 7B:
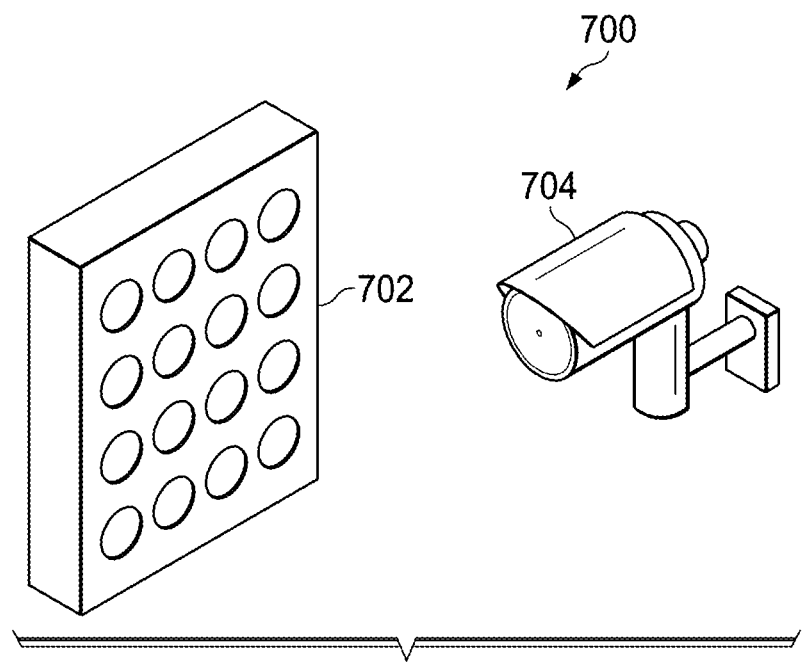
FIG. 7B is a schematic diagram of an example visible light communication system that can be used with aspects of this disclosure.

FIG. 7A is a block diagram of an example visible light communication system 700 that can be used with aspects of this disclosure. FIG. 7B is a schematic diagram of an example visible light communication system 700 that can be used with aspects of this disclosure. An LED transmitter 702 includes an LED driver 703a and an LED array 703b. The LED driver 703a is capable of receiving a data stream, for example, from a sensor, and encoding the data stream. In some implementations, the data stream can include instructions. The LED driver 703a can then modulate the LED array 703b, to emit the set of stream. The stream can then be received by a receiver 704 such as an image sensor 704a. In some implementations, the sensor 704a can be a video camera with a CMOS image sensor, such as camera 202. The image sensor 704a converts the set of instructions into the image stream The LED driver 703a regulates the power to the LED array 703b depending on the received data stream. In some implementations, modulation of the LED array 703b is based on on-off-key (OOK) modulation, where the LED array 703b is switched on and off according to the binary sequence of the received data stream. The LED array 703b includes either a monochrome LED or a white LED that is able to change the light intensity without flickering. In some implementations, the LED array 703b can be pre-equipped with pulse width modulated (PWM) dimming circuits that can be used for VLC with little or no modifications to the circuit design. OOK modulation techniques include rolling shutter effect based modulation, undersampled frequency shift on-off keying (UFSOOK) and undersampled phase shift OOK (UPSOOK). In UFSOOK modulation data is transmitted as two square wave patterns with different frequencies. In UPSOOK the data is transmitted as a square wave subcarrier phase shift keying modulated signal with a carrier frequency higher than the visual critical flicker frequency but lower than the maximum frame rate of the camera. While described primarily as using an LED array 703b, the transmitter can use a single LED with similar affects.

In some implementations, the receiver 704 is an intelligent camera 202 that receives the transmitted data and decodes the data through signal processing to an intelligible format. The camera 202 can detect the LED array by different methods. Cameras that employ CMOS image sensors can receive the transmitted information by observing the rolling shutter effect produced by the modulated LED array 703b by setting a short exposure time and increasing the sensitivity of the sensor, where the pulse frequency of the LED array 703b is lower than the rolling shutter's sampling frequency. For each frame received by the camera 202, the LED array 703b is decoded in a sequential manner by algorithms that extract the region of interest and perform image and signal processing to retrieve the transmitted sensor output. In UFSOOK the camera continuously undersamples the LED signal to produce steady states (either ON or OFF) or blink states (ON-OFF or OFF-ON) and in UPSOOK the frequency of the synchronization frame is represented by a square wave that corresponds to half ON illumination at the camera image sensor.

Figure 7C:
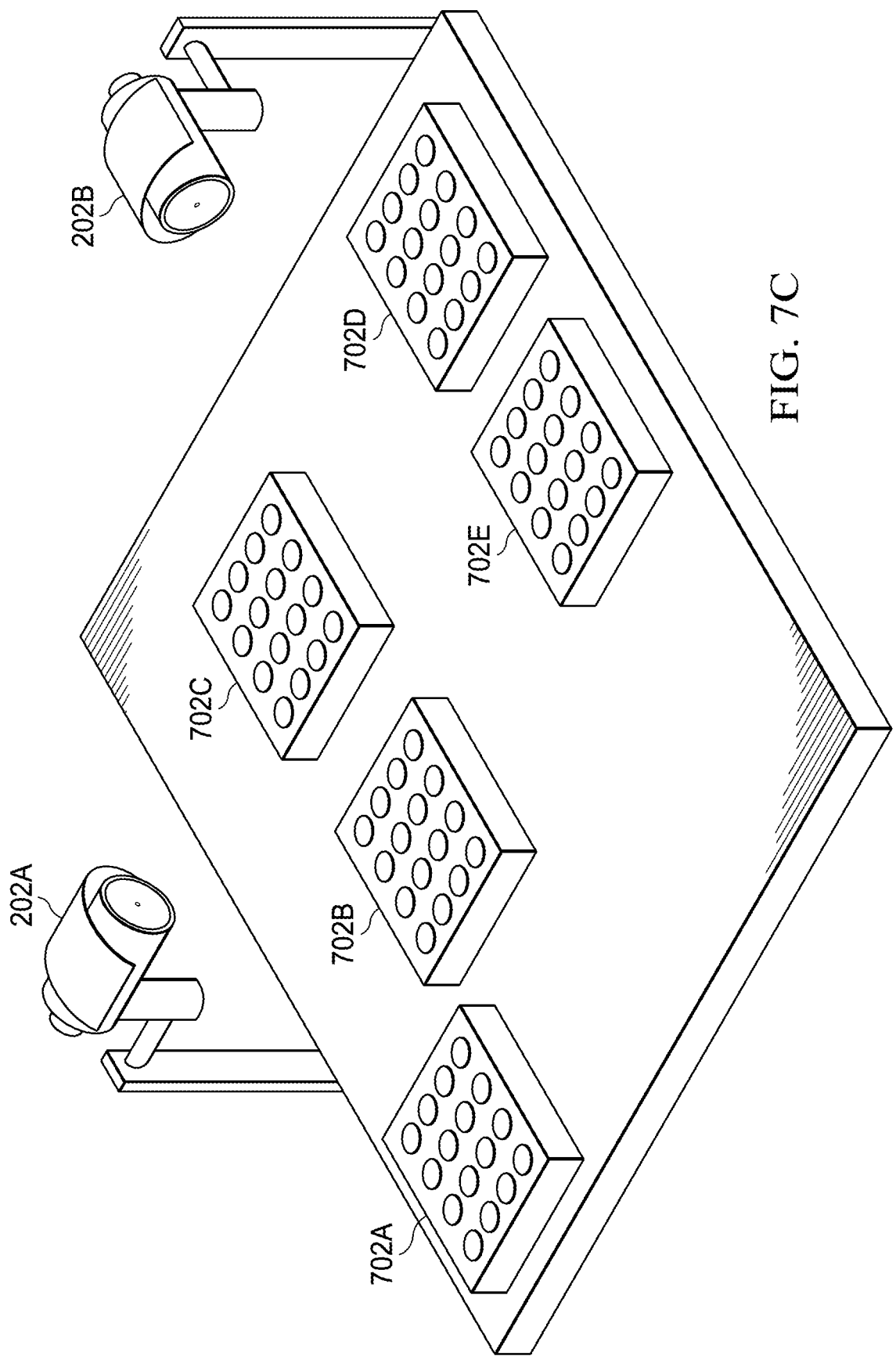
FIG. 7C is a schematic diagram of an example visible light communication system that can be used with aspects of this disclosure.

FIG. 7C is a schematic diagram of an example visible light communication system that can be used with aspects of this disclosure. In the illustrated implementation, multiple transmitters 702 are in view of each of the cameras 202. A first transmitter 702a, a second transmitter 702b, and a third transmitter 702c are in view of a first camera 202a. A fourth transmitter 702d and a fifth transmitter 702e are in view of a second camera 202b. Each transmitter 702 can be used to transfer a different information stream, such as a data stream from a sensor or instructions from another component. The cameras 202 are capable of receiving information streams from multiple transmitters within their field of view simultaneously.

In general, OCC can be adopted for multiple-input and multiple-output (MIMO) communication, where all the LED arrays 703b corresponding to different sensor data, for example, can emit to an image sensor in the camera simultaneously. Signals from the multiple LED arrays 703b are received by the camera 202 as an image and projected onto different locations of the CMOS image sensor. In some implementations, the camera 202 can classify multiple spatially separated and/or RGB color mixed transmitters 702 due to its high resolution and/or Bayer pattern filter layout. Then each individual pixel of the image is processed by the gateways 204 to extract data. OCC employs many multiple access techniques for MIMO such as time division multiple access (TDMA), frequency division multiple access (FDMA), wavelength division multiple access (WDMA), space division multiple access (SDMA) and optical code division multiple access (CDMA).

Depending on the frequency of data communication, a single camera 202 can acts as a receiver for several transmitters 702 or only one transmitter 702. Data, for example, obtained by measurement while drilling (MWD) or logging while drilling (LWD) activities, can be transmitted to the rig by a technique known as mud pulse telemetry (MP). MP telemetry systems take advantage of the circulation of drilling mud to transmit data. During drilling, mud is circulated from pumps at the rig, down the drillstring, through the bottom-hole assembly (BHA), out the bit and back to the surface. In MP telemetry, a valve in the BHA can be momentarily closed, obstructing the mud flow and producing a back pressure pulse that can be detected at the surface. Data is represented by the timing of these pulses. The MP unit is placed in the MWD tool and the data from the instruments in MWD/LWD tools is passed onto the microprocessor/control system of the MP unit, where the data is compressed, modulated and encoded. MP telemetry is activated by a pre-programmed mechanism such as drilling fluid flow or drilling fluid pressure increase within the drillstring assembly. The MP unit then sends pressure pulses corresponding to the instrument data to the surface, and these pressure pulses are converted to comprehensible data by pressure transducers and signal processing on the rig. The system at the surface has a matching system to demodulate, decode and decompress the data. This process is an example of 'uplink' communication. The output of this system can be interfaced with LED arrays 703b and OCC can be utilized instead of wired or RF wireless setups as a method of data transmission using visible light communication. In 'downlink' communication pressure pulses are sent from the surface to the MP unit by making changes to the surface pressure, flowrate or RPM, depending on the sophistication of the particular system in use.

Figure 8:
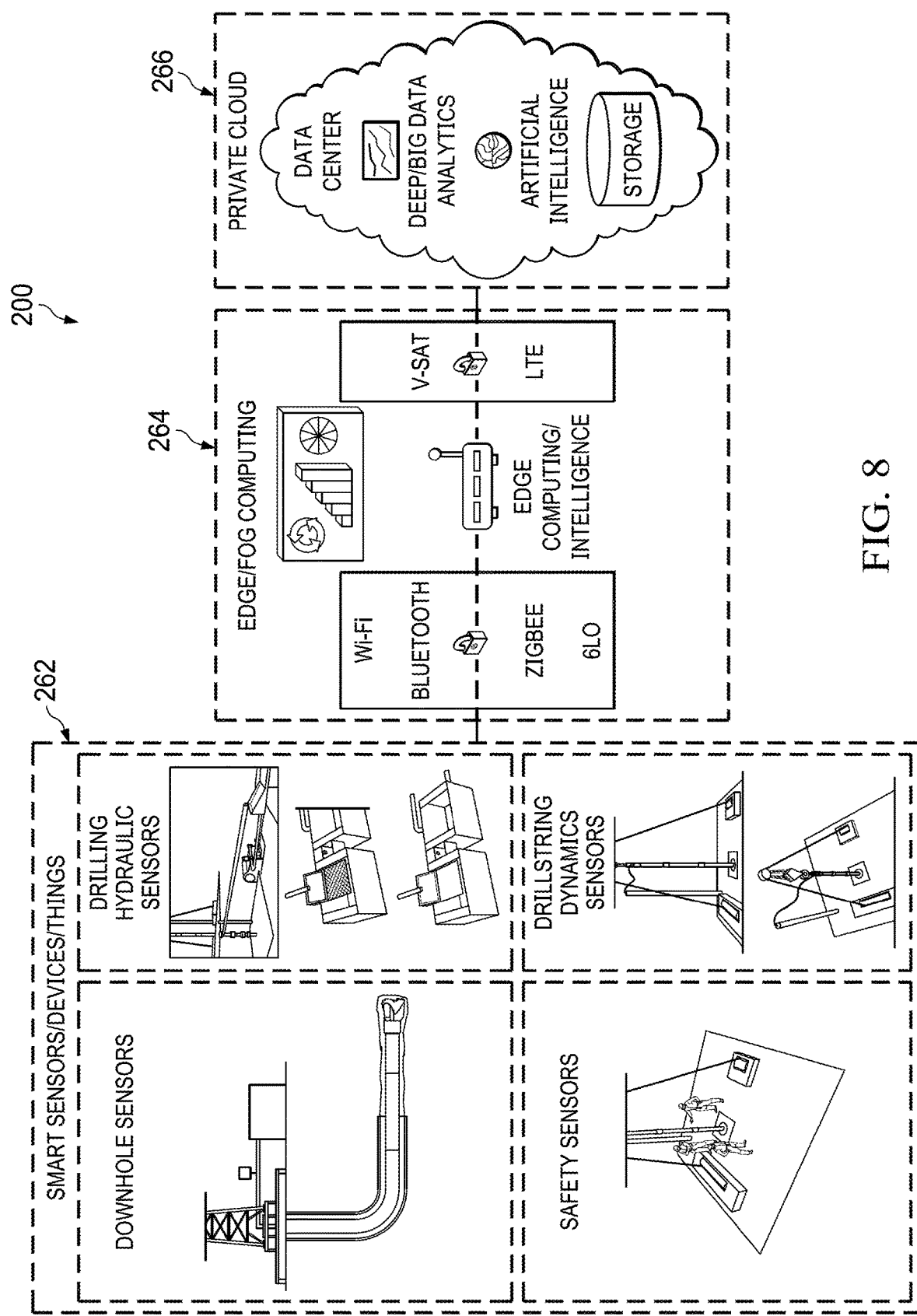
FIG. 8 is a system block diagram of an example system that can be used with aspects of this disclosure.

FIG. 8 is a system block diagram of the example system 200 that can be used with aspects of this disclosure. The system includes three main parts, the data generation portion 262, the data gathering and analytics portion 264, and the storage/big/deep analytics portion 266. The data generation portion can include the rig system 100, the rig monitoring system 200, or both. The rig system 100 produces a large amount of data. This large amount of data is transferred to the on-site edge gateway 204, located at the rig site, where the on-site edge gateway 204 performs a bulk of the processing and automation handling. Data can be sent to the on-site edge gateway 204 through several different communication protocols, such as the OCC system previously described, Wi-Fi, Bluetooth, ZigBee, 6Lo, or any other appropriate communication protocol for the amount of data being sent to the on-site edge gateway 204. The on-site edge gateway 204 can then truncate the received data, perform analytics locally, on the rig, to enrich the data based on specific machine learning, artificial intelligence algorithms, and only send a portion of the data, such as actionable information, to an off-site location for storage, analysis and trending.

The truncated data can be transmitted by very small aperture terminal (VSAT) or cellular standard technology such as LTE to a private cloud 266, which acts as the internal corporate central data center. The security, access and privacy frameworks are defined by internal policies and procedures, which can be same as for the sensor network and edge/fog computing system at the rig. While edge/computing rapidly processes data and to perform decision making in real-time the private cloud can be used to store historical data and also perform large scale deep learning and big data analytics.

Figure 9A:
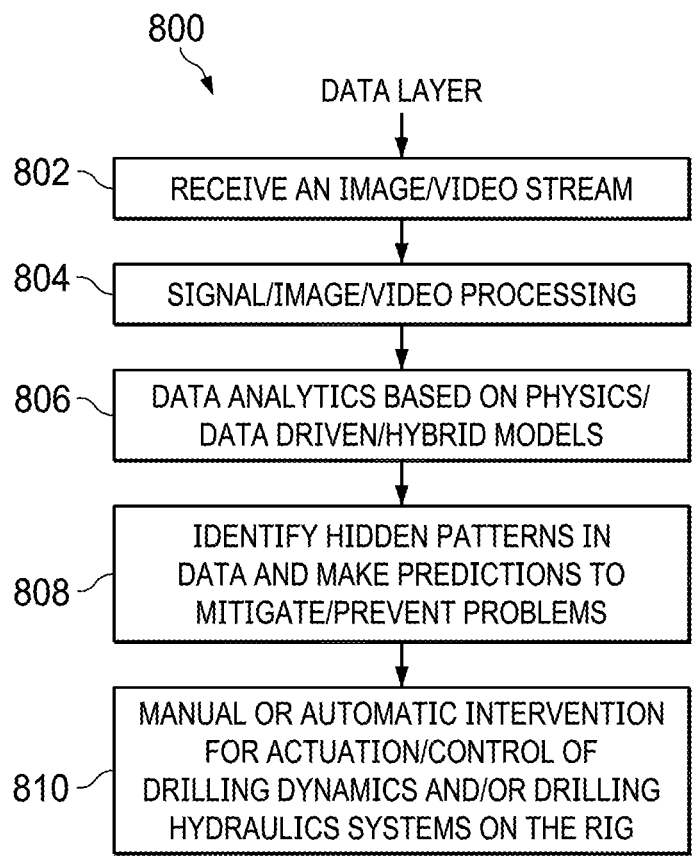
FIG. 9A is a flowchart of an example method that can be used with aspects of this disclosure.

FIG. 9A is a flowchart of an example method 800 for image-based inspection of equipment on drilling rigs, for example, performed by the example monitoring system 200 on the example rig system 100. For clarity of presentation, the description that follows generally describes method 800 in the context of components in other figures of this description. However, it will be understood that method 800 can be performed, for example, by any suitable system, environment, software, hardware, or a combination of systems, environments, software, and hardware, as appropriate. In some implementations, various steps of method 800 can be run in parallel, in combination, in loops, or in any order.

Starting with a data layer, at step 802, the monitoring system 200 receives an image stream, video stream, or a combination of these of a component on the rig system 100 from the image sensor 202. At step 804, the signal/image/video stream of the well component is processed by the onsite edge gateway 204. At step 806, the monitoring system 200 accesses data analytics based on physics, data driven, or hybrid models (or a combination of these) accessible by the onsite edge gateway 204. For example, the physics, data driven, and hybrid models can be stored on a private cloud communicably connected to the edge gateway 204, or elsewhere. At step 808, the monitoring system 200 identifies hidden patterns in data and makes a prediction that mitigates or prevents problems with a process or component. At step 810, the monitoring system 200, particularly the edge gateway 204, instructs a manual or automatic intervention for actuation or control of drilling dynamics, drilling hydraulics systems, or both, on the rig.

Figure 9B:
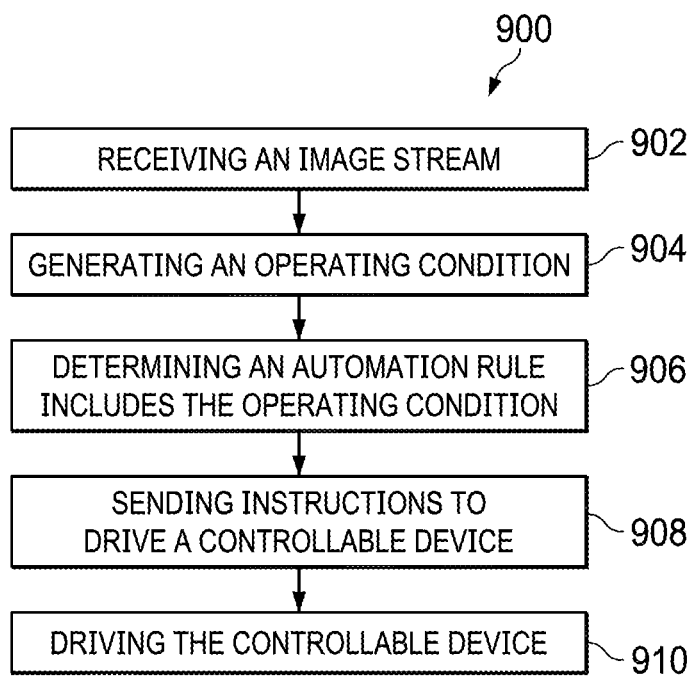
FIG. 9B is a flowchart of an example method that can be used with aspects of this disclosure.

FIG. 9B is a flowchart of an example method 900 for monitoring rig operations, according to some implementations of the present disclosure. For clarity of presentation, the description that follows generally describes method 900 in the context of the other figures in this description. However, it will be understood that method 900 can be performed, for example, by any suitable system, environment, software, and hardware, or a combination of systems, environments, software, and hardware, as appropriate. In some implementations, various steps of method 900 can be run in parallel, in combination, in loops, or in any order.

At 902, an image stream is received from at least one of a plurality of image sensors. From 902, method 900 proceeds to 904. At 904, an operating condition is generated from the image stream. From 904, method 900 proceeds to 906. At 906, an automation rule is determined to include the operating condition generated from the image stream. From 906, method 900 proceeds to 908. At, 908, responsive to determining that an automation rule includes the operating condition, an instruction to drive a controllable device is sent.

In some implementations, method 900 further includes driving the controllable device responsive to the sent instruction. In some implementations, the controllable device can be a single device. In some implementations, the controllable device can include multiple devices. In instances where multiple devices are controlled, the multiple devices can be controlled in series, parallel, or a combination. In some implementations, the controllable device can include a valve. In such an instance, driving the controllable device can include changing a position of the valve, reporting a position of the valve, or a combination. In some implementations, the controllable device can include a rotary table 306. In such an instance, driving the controllable device can include changing a rotational speed or position of the rotary table 306. In some implementations, the controllable device can include a pump. In such instances, driving the controllable device can include changing a rotational speed of the pump.

In some implementations, method 900 can further included communicating instructions though VLC. For example, in implementations where a VLC system similar to implementations previously described is used, a set of instructions is encoded by an LED driver. An LED array is modulated by the LED driver to emit the set of instructions. The set of instructions is received by at least one image sensor. The set of instructions is converted into an image stream by at least one of the image sensors. In some implantations, encoding the instructions can include on-off-key modulation. In such instances, the on-off-key modulation can include under sampled frequency shift on-off-keying. In some implementations, receiving the instruction can include using under sampled frequency shift on-off-keying. Such a tactic is particularly useful for image sensors that have a frame-rate, such as a camera. In some implementations, a first LED array send a first set of instructions while a second LED array sends a second set of instructions. Both the first set of instructions and the second set of instructions are received simultaneously by the image sensor. In such an instance, the image stream can include both sets of instructions. While described as being able to receive one or two sets of instructions from one or two LED arrays, greater number of LED arrays can be used to send a greater number of instructions that are received by a single image sensor.

Figure 10:
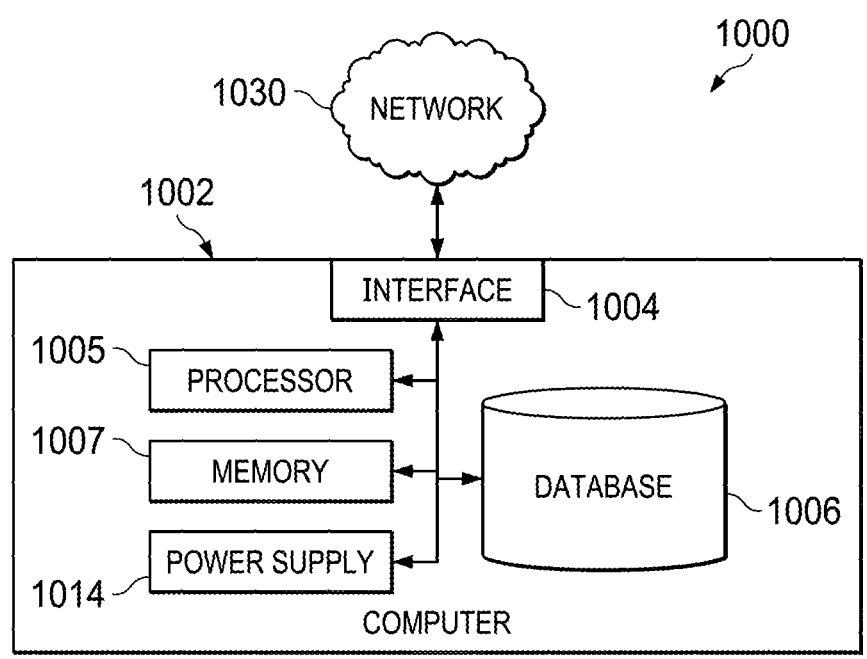
FIG. 10 is a block diagram illustrating an example computer system used to provide computational functionalities associated with described algorithms, methods, functions, processes, flows, and procedures as described in the present disclosure, according to some implementations of the present disclosure.

FIG. 10 is a block diagram of an example computer system 1000 that can be used to provide computational functionalities associated with described algorithms, methods, functions, processes, flows, and procedures described in the present disclosure, according to some implementations of the present disclosure. In some implementations, the on-site edge gateway 303 can be the computer system 1000 or include the computer system 1000. In some implementations, the on-site edge gateway 303 can communicate with the computer system 1000.

The illustrated computer 1002 is intended to encompass any computing device such as a server, a desktop computer, embedded computer, a laptop/notebook computer, a wireless data port, a smart phone, a personal data assistant (PDA), a tablet computing device, or one or more processors within these devices, including physical instances, virtual instances, or both. The computer 1002 can include input devices such as keypads, keyboards, and touch screens that can accept user information. Also, the computer 1002 can include output devices that can convey information associated with the operation of the computer 1002. The information can include digital data, visual data, audio information, or a combination of information. The information can be presented in a graphical user interface (UI) (or GUI). In some implementations, the inputs and outputs include display ports (such as DVI-I+2× display ports), USB 3.0, GbE ports, isolated DI/O, SATA-III (6.0 Gb/s) ports, mPCIe slots, a combination of these, or other ports. In instances of an edge gateway, the computer 1002 can include a Smart Embedded Management Agent (SEMA), such as a built-in ADLINK SEMA 2.2, and a video sync technology, such as Quick Sync Video technology supported by ADLINK MSDK+. In some examples, the computer 1002 can include the MXE-5400 Series processor-based fanless embedded computer by ADLINK, though the computer 1002 can take other forms or include other components.

The computer 1002 can serve in a role as a client, a network component, a server, a database, a persistency, or components of a computer system for performing the subject matter described in the present disclosure. The illustrated computer 1002 is communicably coupled with a network 1030. In some implementations, one or more components of the computer 1002 can be configured to operate within different environments, including cloud-computing-based environments, local environments, global environments, and combinations of environments.

At a high level, the computer 1002 is an electronic computing device operable to receive, transmit, process, store, and manage data and information associated with the described subject matter. According to some implementations, the computer 1002 can also include, or be communicably coupled with, an application server, an email server, a web server, a caching server, a streaming data server, or a combination of servers.

The computer 1002 can receive requests over network 1030 from a client application (for example, executing on another computer 1002). The computer 1002 can respond to the received requests by processing the received requests using software applications. Requests can also be sent to the computer 1002 from internal users (for example, from a command console), external (or third) parties, automated applications, entities, individuals, systems, and computers.

Each of the components of the computer 1002 can communicate using a system bus. In some implementations, any or all of the components of the computer 1002, including hardware or software components, can interface with each other or the interface 1004 (or a combination of both), over the system bus. Interfaces can use an application programming interface (API), a service layer, or a combination of the API and service layer. The API can include specifications for routines, data structures, and object classes. The API can be either computer-language independent or dependent. The API can refer to a complete interface, a single function, or a set of APIs.

The service layer can provide software services to the computer 1002 and other components (whether illustrated or not) that are communicably coupled to the computer 1002. The functionality of the computer 1002 can be accessible for all service consumers using this service layer. Software services, such as those provided by the service layer, can provide reusable, defined functionalities through a defined interface. For example, the interface can be software written in JAVA, C++, Python, R, or a language providing data in extensible markup language (XML) format. While illustrated as an integrated component of the computer 1002, in alternative implementations, the API or the service layer can be stand-alone components in relation to other components of the computer 1002 and other components communicably coupled to the computer 1002. Moreover, any or all parts of the API or the service layer can be implemented as child or sub-modules of another software module, enterprise application, or hardware module without departing from the scope of the present disclosure.

The computer 1002 can include an interface 1004. Although illustrated as a single interface 1004 in FIG. 10, two or more interfaces 1004 can be used according to particular needs, desires, or particular implementations of the computer 1002 and the described functionality. The interface 1004 can be used by the computer 1002 for communicating with other systems that are connected to the network 1030 (whether illustrated or not) in a distributed environment. Generally, the interface 1004 can include, or be implemented using, logic encoded in software or hardware (or a combination of software and hardware) operable to communicate with the network 1030. More specifically, the interface 1004 can include software supporting one or more communication protocols associated with communications. As such, the network 1030 or the interface's hardware can be operable to communicate physical signals within and outside of the illustrated computer 1002.

The computer 1002 includes a processor 1005. Although illustrated as a single processor 1005 in FIG. 10, two or more processors 1005 can be used according to particular needs, desires, or particular implementations of the computer 1002 and the described functionality. Generally, the processor 1005 can execute instructions and can manipulate data to perform the operations of the computer 1002, including operations using algorithms, methods, functions, processes, flows, and procedures as described in the present disclosure.

The computer 1002 can also include a database 1006 that can hold data for the computer 1002 and other components connected to the network 1030 (whether illustrated or not). For example, database 1006 can be an in-memory, conventional, or a database storing data consistent with the present disclosure. In some implementations, database 1006 can be a combination of two or more different database types (for example, hybrid in-memory and conventional databases) according to particular needs, desires, or particular implementations of the computer 1002 and the described functionality. Although illustrated as a single database 1006 in FIG. 10, two or more databases (of the same, different, or combination of types) can be used according to particular needs, desires, or particular implementations of the computer 1002 and the described functionality. While database 1006 is illustrated as an internal component of the computer 1002, in alternative implementations, database 1006 can be external to the computer 1002.

The computer 1002 also includes a memory 1007 that can hold data for the computer 1002 or a combination of components connected to the network 1030 (whether illustrated or not). Memory 1007 can store any data consistent with the present disclosure. In some implementations, memory 1007 can be a combination of two or more different types of memory (for example, a combination of semiconductor and magnetic storage) according to particular needs, desires, or particular implementations of the computer 1002 and the described functionality. Although illustrated as a single memory 1007 in FIG. 10, two or more memories 1007 (of the same, different, or combination of types) can be used according to particular needs, desires, or particular implementations of the computer 1002 and the described functionality. While memory 1007 is illustrated as an internal component of the computer 1002, in alternative implementations, memory 1007 can be external to the computer 1002.

An application can be an algorithmic software engine providing functionality according to particular needs, desires, or particular implementations of the computer 1002 and the described functionality. For example, an application can serve as one or more components, modules, or applications. Multiple applications can be implemented on the computer 1002. Each application can be internal or external to the computer 1002.

The computer 1002 can also include a power supply 1014. The power supply 1014 can include a rechargeable or non-rechargeable battery that can be configured to be either user- or non-user-replaceable. In some implementations, the power supply 1014 can include power-conversion and management circuits, including recharging, standby, and power management functionalities. In some implementations, the power-supply 1014 can include a power plug to allow the computer 1002 to be plugged into a wall socket or a power source to, for example, power the computer 1002 or recharge a rechargeable battery.

There can be any number of computers 1002 associated with, or external to, a computer system containing computer 1002, with each computer 1002 communicating over network 1030. Further, the terms "client," "user," and other appropriate terminology can be used interchangeably, as appropriate, without departing from the scope of the present disclosure. Moreover, the present disclosure contemplates that many users can use one computer 1002 and one user can use multiple computers 1002.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/–R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A system comprising:
a plurality of image sensors positioned around a rig, the plurality of image sensors comprising at least a first image sensor;
a plurality of visible light transmitters positioned on the rig and in view of at least one of the plurality of image sensors, wherein the plurality of visible light transmitters comprises at least a first visible light transmitter and a second visible light transmitter, the plurality of visible light transmitters configured to be connected to sensor components of the rig, and the plurality of image sensors configured to receive data from the plurality of visible light transmitters via visible light communication, wherein the first visible light transmitter is connected to a first sensor component and a second visible light transmitter is connected to a second sensor component different from the first sensor component, the first visible light transmitter and second visible light transmitter being positioned on the rig in view of the first image sensor, and the first image sensor configured to receive data from the first visible light transmitter and the second visible light transmitter; and
an on-site edge or fog computing gateway communicably coupled to the plurality of image sensors and comprising:
one or more processors; and
a non-transitory computer-readable storage medium coupled to the one or more processors and storing programming instructions for execution by the one or more processors, the programming instructions instruct the one or more processors to:

receive an image stream form at least one of the plurality of image sensors;

generate, from the image stream, an operating condition;

determine that an automation rule includes the operating condition generated from the image stream;

responsive to determining that an automation rule includes the operating condition, send an instruction to drive a controllable device; and responsive to sending an instruction to drive the controllable device, drive the controllable device.

2. The system of claim 1, wherein the programming instructions further comprise:

determine a priority of the generated operating condition and communicate the detected operating condition to an automation system configured to proactively prevent or recover the operating condition to normalized operations; and apply a ranking criteria to the operating condition based on a severity and probability of occurrence of the operating condition, the ranking criteria configured to determine an order of operations for prioritizing a next recommended task.

3. The system of claim 2, wherein the programming instructions comprises:

execute an action automatically to address the operating condition or provide guidance to manually intervene to address the operating condition.

4. The system of claim 1, further comprising:

a first wired or wireless communicable coupling between the plurality of image sensors and the on-site edge or fog computing gateway; and a second wired or wireless communicable coupling between the on-site edge or fog computing gateway and the controllable device.

5. The system of claim 1, wherein the plurality of visible light transmitters comprises:

a plurality of LED arrays in view of at least one of the plurality of image sensors; and a plurality of LED drivers, each LED driver being electronically coupled to one of the plurality of LED arrays, each LED driver configured to modulate the LED array to transfer data.

6. The system of claim 5, wherein the plurality of LED arrays comprise monochrome LEDs.

7. The system of claim 5, wherein the image sensors are configured to receive the data from the LED array and convert the instructions to be included into the image stream.

8. The system of claim 1, wherein the rig is a drill rig, and the system further comprising:

a plurality of particles including tracer particles with optical properties added to a mud system configured for detection by the plurality of image sensors;

wherein an image sensor of the plurality of image sensors comprises a particle image velocimetry (PIV) configured to visualize the particles and at least one of determine a flow speed of the particles or determine a pH of the particles;

a wheel with reflectors proximate to a flow in line and a flow out line of the mud system, the plurality of image sensors configured to monitor a velocity of the wheel turning in response to the flow of the mud;

an automated fluid management system comprising tanks with level indicators configured for detection by the plurality of image sensors; and a target attached to a kelly saver sub on the rig, the target comprising an identifier including at least one of a reflector or an LED, the identifier configured to be detected by the image sensor.

9. The system of claim 1, wherein the generated operating condition includes the instructions.

10. The system of claim 1, wherein the controllable device comprises a valve.

11. The system of claim 1, wherein the controllable device comprises a drawworks, kelly, swivel, rotary table, topdrive, or blowout preventer rams.

12. The system of claim 1, wherein the controllable device comprises a pump, mud motor, mud mixer, or a mud circulating system.

13. The system of claim 1, wherein the controllable device comprises a well shutdown system.

14. A method comprising:

connecting a plurality of visible light transmitters to sensor components positioned around a rig, wherein the plurality of visible light transmitters comprises a first visible light transmitter connected to a first sensor component and a second visible light transmitter connected to a second sensor component different from the first sensor component;

positioning the plurality of visible light transmitters on the rig and in view of a plurality of image sensors comprising at least a first image sensor, the plurality of image sensors to receive data from the plurality of visible light transmitters via visible light communication, wherein the first image sensor is configured to receive data from the first visible light transmitter and the second visible light transmitter;

receiving an image stream from at least one of the plurality of image sensors;

generating, from the image stream, an operating condition;

determining that an automation rule includes the operating condition generated from the image stream;

responsive to determining that an automation rule includes the operating condition, sending an instruction to drive a controllable device; and responsive to sending an instruction to drive the controllable device, driving the controllable device.

15. The method of claim 14, wherein the plurality of visible light transmitters comprises an LED driver and an LED array, the method further comprising:

encoding a set of instructions by the LED driver;

modulating the LED array, by the LED driver, to emit the set of instructions;

receive the set of instructions by at least one of the plurality of image sensor; and convert the set of instructions into the image stream by at least one of the plurality of image sensors.

16. The method of claim 15, wherein encoding the instructions comprises on-off-key modulation.

17. The method of claim 16, wherein the on-off-key modulation comprises under sampled frequency shift on-off-keying.

18. The method of claim 15, wherein receiving the instruction comprises using under sampled frequency shift on-off-keying.

19. The method of claim 15, wherein the LED array is a first LED array, and the set of instructions is a first set of instructions, the method further comprising:

receiving a second set of instructions, from a second LED array, by the image sensor, while simultaneously receiving instructions from the first LED array.

20. The method of claim 14, further comprising driving the controllable device responsive to the sent instruction.

21. The method of claim 20, wherein the controllable device comprises a valve, and driving the controllable device comprises changing a position of the valve.

22. The method of claim 20, wherein the controllable device comprises a drawworks, and driving the controllable device comprises changing tension on the drawworks.

23. The method of claim 20, wherein the controllable device comprises a rotary table, and driving the controllable device comprises changing the speed of the rotary table.

24. The method of claim 20, wherein the controllable device comprises a top drive, and driving the controllable device comprises changing weight on a drill bit connected to the top drive.

25. The method of claim 20, wherein the controllable device comprises a top drive, and driving the controllable device comprises changing rotational speed of the top drive.

26. The method of claim 20, wherein the controllable device comprises a motor, and driving the controllable device comprises changing torque applied by the motor.

27. The method of claim 20, wherein the controllable device comprises a blowout preventer, and driving the controllable device comprises closing rams of the blowout preventer.

28. The method of claim 20, wherein the controllable device comprises a pump, and driving the controllable device comprises changing rotational speed of the pump.

29. The method of claim 20, wherein the controllable device comprises a mud motor, and driving the controllable device comprises changing rotational speed of the mud motor.

30. The method of claim 20, wherein the controllable device comprises a mud mixer, and driving the controllable device comprises changing mixing speed and frequency of the mud mixer.

31. The method of claim 20, wherein the controllable device comprises a mud circulating system, and driving the controllable device comprises changing circulating speed and frequency of the system.

32. A system comprising:
a plurality of image sensors positioned around a rig, the plurality of image sensors comprising a first image sensor;
a plurality of LED arrays positioned on the rig and in view of at least one of the plurality of image sensors, the plurality of LED arrays comprising at least a first LED array and a second LED array;
a plurality of LED drivers, each LED driver being electronically coupled to one of the plurality of LED arrays, each LED driver configured to modulate the LED array to transfer data via visible light communication; and
an on-site edge or fog computing gateway communicably coupled to the plurality of image sensors and comprising:
one or more processors; and
a non-transitory computer-readable storage medium coupled to the one or more processors and storing programming instructions for execution by the one or more processors, the programming instructions instruct the one or more processors to:
receive an image stream from at least one of the plurality of image sensors, the image stream comprising data from at least one of the plurality of LED arrays, wherein the first image sensor is configured to receive a first image stream of the first LED array and the second LED array;
generate, from the image stream, an operating condition;
determine that an automation rule includes the operating condition generated from the image stream; and
responsive to determining that an automation rule includes the operating condition, send an instruction to drive a controllable device.

33. The system of claim 32, wherein the programming instructions comprises:
determine a priority of the generated operating condition and communicate the detected operating condition to an automation system configured to proactively prevent or recover the operating condition to normalized operations; and
apply a ranking criteria to the operating condition based on a severity and probability of occurrence of the operating conditions, the ranking criteria configured to determine an order of operations for prioritizing a next recommended task.

34. The system of claim 33, wherein the programming instructions comprises:
execute an action automatically to address the operating condition or provide guidance to manually intervene to address the operating condition.

* * * * *

UNITED STATES PATENT AND TRADEMARK OFFICE
CERTIFICATE OF CORRECTION

PATENT NO. : 11,280,177 B2
APPLICATION NO. : 16/715820
DATED : March 22, 2022
INVENTOR(S) : Chinthaka Pasan Gooneratne, Michael Affleck and Timothy E. Moellendick It is certified that error appears in the above-identified patent and that said Letters Patent is hereby corrected as shown below:

On the Title Page

In Column 2, item [57], Line 9, delete "form" and insert -- from --, therefor.

In the Claims

In Column 31, Line 4, Claim 1 delete "form" and insert -- from --, therefor.

Signed and Sealed this
Fourteenth Day of June, 2022

Katherine Kelly Vidal
*Director of the United States Patent and Trademark Office*